US008759707B2

(12) United States Patent
Schmidt

(10) Patent No.: US 8,759,707 B2
(45) Date of Patent: Jun. 24, 2014

(54) MANUFACTURING AND USE OF MICROPERFORATED SUBSTRATES

(75) Inventor: Christian Schmidt, Epalinges (CH)

(73) Assignee: Picodrill SA, Lausanne (CH)

( * ) Notice: Subject to any disclaimer, the term of this patent is extended or adjusted under 35 U.S.C. 154(b) by 655 days.

(21) Appl. No.: 10/594,991

(22) PCT Filed: Mar. 30, 2005

(86) PCT No.: PCT/EP2005/003319
§ 371 (c)(1), (2), (4) Date: Nov. 21, 2006

(87) PCT Pub. No.: WO2005/097439
PCT Pub. Date: Oct. 20, 2005

(65) Prior Publication Data

US 2008/0047935 A1 Feb. 28, 2008

(30) Foreign Application Priority Data

Apr. 1, 2004 (CH) ................................ 2004/000206
May 7, 2004 (CH) ................................ 2004/000279

(51) Int. Cl.
*B23H 1/02* (2006.01)

(52) U.S. Cl.
USPC ........................................ 219/69.11; 219/384

(58) Field of Classification Search
USPC ............................................... 219/69.1, 69.11
See application file for complete search history.

(56) References Cited

U.S. PATENT DOCUMENTS

| | | | | |
|---|---|---|---|---|
| 3,588,431 A | | 6/1971 | Pekelharing et al. | |
| 3,760,153 A | * | 9/1973 | Davies et al. | 219/384 |
| 4,235,647 A | * | 11/1980 | Sano et al. | 219/68 |
| 4,777,338 A | | 10/1988 | Cross | |
| 5,036,176 A | | 7/1991 | Yamaguchi et al. | |
| 6,348,675 B1 | * | 2/2002 | Takagi | 219/384 |
| 6,385,500 B1 | * | 5/2002 | Hebbar et al. | 700/162 |

FOREIGN PATENT DOCUMENTS

| | | |
|---|---|---|
| GB | 1089369 A | 11/1967 |
| GB | 1096269 A | 12/1967 |
| GB | 1165458 A | 10/1969 |
| WO | WO 99/31503 A | 7/1999 |

OTHER PUBLICATIONS

"Elektrostatische Mikropefforation: Energieensparung und Leistungsverbesserung" Papier + Kunststoff Verarbeiter, Deutsche Fachverlag. Frankfurt, DE, vol. 33, No. 3, Mar. 1998, p. 46.
Mueller et al., Methods for the formulation of Single Bimolecular Lipid Membranes in Aqueous Solution, Communications to the Editor, J. Phys. Chem., vol. 67, p. 534-535 (Feb. 1963).

(Continued)

*Primary Examiner* — Brian Jennison
(74) *Attorney, Agent, or Firm* — Pearl Cohen Zedek Latzer Baratz LLP

(57) ABSTRACT

This invention relates to methods and devices for the production of micro-structured substrates and their application in natural sciences and technology, in particular in analysis and detection systems based on artificial and biological lipid membranes. The structure is preferably a hole or a cavity or channel and is obtained by spark perforation. Energy, preferably heat, is applied to the region to be structured so as to reduce the amplitude of voltage required and/or soften the material. The electrical parameters of the spark perforation are feedback-controlled.

46 Claims, 16 Drawing Sheets

(56) References Cited

OTHER PUBLICATIONS

Reynaerts et al., "Microstructuring of Silicon by electro-discharge machining (EDM)—part 1: theory," Sensors and Actuators, A 60 (1997) pp. 212-218.

Zhang et al., "Precision shaping of small diameter wheels using micro electric discharge truing (MEDT) and hole-machining of $Al_2O_3$ material," International Journal of Machine Tools & Manufacture, 40 (2000) pp. 661-674.

Yan et al., "Study of precision micro-holes in borosilicate glass using micro EDM combined with micro ultrasonic vibration machining," International Journal of Machine Tools & Manufacture, 42 (2002) pp. 1105-1112.

Yang et al. "Micro Hole Machining of Borosilicate Glass through Electrochemical Discharge Machining (ECDM)," Key Engineering Materials, vol. 196 (2001) pp. 149-166.

Official Communication for European Patent Application No. 05716445.1, mailed Nov. 12, 2012.

* cited by examiner

MANUFACTURING AND USE OF MICROPERFORATED SUBSTRATES

FIELD OF THE INVENTION

This invention relates to methods and devices for the production of micro-structured substrates and their application in natural sciences and technology, in particular in analysis and detection systems based on artificial and biological lipid membranes.

BACKGROUND OF THE INVENTION

Many biological, physical or chemical analysis methods are based on lipid bilayers and biological membranes, respectively. Some of these techniques require the direct access to specific parts/patches of the membrane being usually ca. 0.1-100 um (um=$10^{-6}$ meter) in diameter. Examples are electrophysiological techniques such as Patch Clamp and Black Lipid Membrane (BLM) analysis. For the standard patch clamp, such parts/patches of the membrane have been exclusively accessed by sealing a micro pipette against the cell membrane. Access to the membrane patch beneath the pipette is then directly provided through this pipette. The remaining membrane area outside the pipette is usually accessed through the solution in which the cell is immersed (B. Sakmann and E. Neher, Ed., *Single-Channel Recording*, Plenum Pub. Corp.; ed. 1, 1983). In the case of artificial lipid membranes (e.g. BLM), thin and perforated insulating sheets separating two fluid compartments have been used to carry the membranes in such a way that they cover the hole and consequently can be independently accessed from both sides (Mueller et al., J. phys. Chem., 67, 534 (1963)).

Lately, micromachined planar solid substrates (also called 'carrier') made of sheets of insulating materials such as silicon/siliconnitride (PCT patent application WO1998IB0001150), glass and plastics have replaced the classical tools for directed membrane access such as micropipettes (as in patch clamp) and TEFLON® septa with conventional holes (as for BLM). Advantages include a much simplified handling during analysis, higher stability, better electrical parameters as well as the possibility to mass manufacture the new membrane carriers.

However, due to the specific needs of carriers for electrophysiology such as the surface adhesion properties and holes sizes as small as 0.1-10 um in ca. 2-200 um thick insulators, current standard materials as well as techniques used for micromachining may not provide a suitable approach to the production of inexpensive but high quality membrane carriers.

It has so far not been possible to produce high quality membrane carriers in a reproducible manner by dielectric breakdown phenomena. More specifically it has not been possible to reproducibly produce substrates having holes in them in which holes have a diameter in the range of 0.1 um to 10 um. It has also not been possible to introduce such holes in a manner allowing for mass production of such perforated substrates. Membrane carriers produced with other methods, such as e.g. lithography and other mainly for semiconductor industry developed micromachining technologies, usually lack one or more characteristics required for membrane carriers such as high aspect ratio holes (preferably >10), chemical and physical surface properties (e.g. functional groups on surface for modification; roughness), hole diameter and in particular simplicity and low cost of production.

Accordingly it was an object of the present invention to provide for a method allowing the production of high quality perforated substrates, e.g. of high quality membrane carriers. It was also an object of the present invention to provide for a method of production of such high quality membrane carriers which method is easy to perform and reproducible. It was furthermore an object to provide for a method allowing the controlled production of holes in substrates, wherein the geometrical features of the holes can be easily controlled and influenced. It was also an object of the present invention to provide for a method allowing the mass production of perforated substrates. It was furthermore an object of the present invention to provide a method of hole production that can be applied to substrates that were hitherto difficult to process, such as glass.

SUMMARY OF THE INVENTION

All these and further objects are solved by a method of forming a structure, preferably a hole or cavity or channel, in a region of an electrically insulating substrate, comprising the steps:

a) providing an electrically insulating substrate, b) applying, by means of a voltage supply, a voltage across a region of said electrically insulating substrate, said voltage being sufficient to give rise to a significant increase in electrical current through said region and to a dielectric breakdown (DEB) through said region, c) applying energy, preferably heat, to said substrate or said region only so as to increase the temperature of said region, said energy, preferably heat, originating either from an energy or heat source or from components of said voltage applied in step b), said energy, preferably heat, being applied so as to reduce the amplitude of voltage required in step b) to give rise to said current increase and/or to soften the material of said region, wherein step b) is performed and, preferably, ended using an electronic feedback mechanism operating according to user-predefined parameters, said electronic feedback mechanism controlling the properties of said applied voltage and/or of said electrical current.

In one embodiment said electronic feedback mechanism causes an end of step b) within a user-predefined period after onset of said dielectric breakdown, said onset preferably being an increase in the number of charge carriers per unit time, by a factor of 2, preferably by at least one order of magnitude.

In one embodiment said significant increase in electrical current is an increase in the number of charge carriers per unit time, by a factor of 2, preferably by at least one order of magnitude.

In one embodiment said electronic feedback mechanism causes said end of step b) to occur—with or without a preset delay—at the time when said electrical current has reached a threshold value, preferably in the range of 0.01 to 10 mA, or at the time, when an increase in electrical current, (dI/dt), has reached a threshold value, preferably equal or larger than 0.01 A/s.

In one embodiment said electronic feedback mechanism is fast enough to be able to cause an end of step b) within a period in the range of from 1 ns to 100 ms, preferably from 1 ns to 100 us, more preferably 100 ns to 10 us, after onset of said dielectric breakdown, or within the aforementioned period after said increase in electrical current has reached said threshold value.

Preferably, said electronic feedback mechanism causes an end of step b) within a period in the range of from 100 ns to 10 s, preferably 100 ns to 1 sec, after onset of said dielectric breakdown or after said increase in electrical current has reached said threshold value.

In one embodiment said end of step b) occurs without any intervention by a user once step b) has been initiated.

Preferably, said electronic feedback mechanism comprises a current and/or voltage analysis circuit such as a trigger circuit, alone or as part of a user-programmed device, such as a computer, said current and/or voltage analysis circuit being capable of controlling voltage supply output parameters, and/or being capable of controlling said energy or heat source, if present.

In one embodiment steps b) and c) occur concomitantly.

In one embodiment step c) is performed under control of a user, preferably by use of said electronic feedback mechanism, wherein, preferably said control of a user involves definition or regulation of the amount and/or the duration of said energy, preferably heat, applied to said region in step c).

In one embodiment said electronic feedback mechanism provides for a regulation of amplitude and/or duration of said voltage and/or said current.

In one embodiment said voltage is in the range of $10^2$ V to $10^6$V, preferably in the range of from $10^3$V-$10^5$V.

In one embodiment step c) is initiated before step b).

In one embodiment step c) is continued after step b) has been ended.

Preferably, step b) occurs by the placement of electrodes at or near said region, preferably by placing one electrode on one side of that substrate and by placing another electrode on another side of said substrate, and by application of said voltage across said electrodes.

In one embodiment at the beginning of step b), said voltage is increased in amplitude up to a value, at which an increase in electrical current through said region occurs and/or where a dielectric breakdown (DEB) through said substrate occurs and/or where an electric arc occurs.

Preferably, said current flows along a current path through said substrate region and changes viscosity and/or stiffness and/or brittleness of said substrate along and near said current path, wherein, preferably, said current softens and/or melts and/or evaporates said substrate along and near said current path, and/or wherein said current and/or said applied voltage cause the removal of substrate material along and near said current path, preferably by evaporation, ejection, electrostatic attraction or a combination thereof.

In one embodiment step b) does not lead to a breakage of said substrate, and wherein, preferably, said current, current increase and voltage parameters are limited by a user to values, said values being more preferably determined experimentally for each substrate material and/or substrate material class, at which values no breakage of said substrate is caused.

In one embodiment said applied voltage is purely DC.

In another embodiment, said applied voltage is purely AC.

In one embodiment said applied voltage is a superposition of AC and DC voltages.

In one embodiment the frequency of said applied AC voltage is in the range of from $10^2$ to $10^{12}$ Hz, preferably in the range of from $5\times10^2$ to $10^8$ Hz, more preferably $1\times10^3$ to $1\times10^7$ Hz.

Preferably, said AC voltage is applied intermittently, preferably in pulse trains of a duration in the range of from 1 ms to 1000 ms, preferably 10 ms to 500 ms, with a pause in between of a duration of at least 1 ms, preferably of at least 10 ms.

Preferably, said applied AC voltage is used for performing step c).

In one embodiment said applied AC voltage has parameters (e.g. amplitude, frequency, duty cycle) which are sufficient to establish an electric arc between a surface of said substrate and said electrodes, wherein, preferably, said electric arc is used for performing step c).

In one embodiment said applied AC voltage leads to dielectric losses in said region of said substrate, said dielectric losses being sufficient to increase the temperature of said region.

In one embodiment the frequency of said applied AC voltage is increased to reduce deviations of the current path from a direct straight line between the electrodes.

Preferably, the frequency of said applied AC voltage is increased to minimize the possible distance between neighbouring structures, preferably neighbouring holes.

In one embodiment, in step c), energy, preferably heat, is applied to said region so as to decrease the voltage amplitude required to initiate dielectric breakdown across this region.

Preferably, in step c), heat is applied to said region of said substrate using a heated electrode or a heating element placed near by the electrode.

In one embodiment said heated electrode is an electric heating filament and is also used to apply said voltage to said region in step b).

Preferably, in step c), heat is applied to said region of said substrate additionally or only by using an external heat source, such as a laser or other focussed light source, or by using a gas flame.

In one embodiment in step c), heat is applied to said region of said substrate by applying an AC voltage to said region.

In one embodiment said AC voltage is applied to said region by electrodes placed on opposite sides of said substrate, preferably at least one electrode being placed on one side of said substrate and at least one electrode being placed on another side of said substrate.

In one embodiment said electrodes placed on opposite sides of said substrate are also used for performing step b).

Preferably, said AC voltage is sufficient to cause dielectric losses in said region of said substrate leading to an increase in temperature in said region.

In one embodiment said AC voltage is in the range of $10^3$ V-$10^6$ V, preferably $2\times10^3$V-$10^5$ V, and has a frequency in the range of from $10^2$ Hz to $10^{12}$ Hz, preferably in the range of from $5\times10^2$ to $10^8$ Hz, more preferably $1\times10^3$ to $1\times10^7$ Hz.

Preferably, said structure being formed is a hole having a diameter in the range of from 0.01 μm to 50 μm, preferably 0.1 μm to 10 μm, and more preferably 0.3 μm to 5 μm.

In one embodiment said structure being formed is a cavity having a diameter in the range of from 0.1 μm to 100 μm.

Preferably, said voltage is applied by electrodes placed on opposite sides of said substrate, and said structure being formed is a channel-like structure obtained by a relative movement of said electrodes in relation to said substrate.

In one embodiment said structure, preferably said hole has an aspect ratio greater than 1, preferably greater than 5.

In one embodiment said electrically insulating substrate is selected from a group comprising carbon-based polymers, such as polypropylene, fluoropolymers, such as TEFLON®, silicon-based substrates, such as glass, quartz, silicon nitride, silicon oxide, silicon based polymers such as SYLGARD®, semiconducting materials such as elemental silicon.

In one embodiment said region where a structure is to be formed, has a thickness in the range of from $10^{-9}$ m to $10^{-2}$ m, preferably $10^{-7}$ m to $10^{-3}$ m, more preferably $10^{-5}$ m to $5\times10^{-4}$ m, most preferably $>10^{-6}$ m.

Preferably, said substrate is provided in step a) within a material (solid, liquid or gas) that reacts with a surface of said substrate during steps b) and/or c).

In one embodiment, after formation of said structure, a surface of said structure is smoothed by further application of heat, preferably by application of heat through step c).

In one embodiment, after formation of said structure, its shape is subsequently altered by further application of heat, preferably by application of heat through step c).

In one embodiment, after formation of said structure, further heat is applied to said substrate, preferably to said region of said substrate, optionally up to the melting point of said substrate material, so as to reduce tensions and/or cracks due to tensions in said substrate. This is also sometimes referred to as tempering.

In one embodiment said further application of heat occurs by an electric arc formed between two electrodes, preferably two electrodes which are used for performing step b).

In one embodiment said electrically insulating substrate is a substrate, wherein dielectric breakdown occurs using a small voltage, in the absence of additional heat or energy, preferably using a voltage in the range below 10 kV, and wherein step c) is omitted altogether.

The objects of the present invention are also solved by a device for forming a structure in a region of an electrically insulating substrate, preferably for performing the method according to the present invention, comprising at least two electrodes connected to a voltage supply, which can be controlled by a trans-substrate current, and means to apply energy, preferably heat, to said substrate, wherein said means is one electrode or said at least two electrodes or is an additional heat source.

In one embodiment of the device according to the present invention, there is no additional heat source.

In one embodiment, the device according to the further invention, further comprises means to receive and hold said electrically insulating substrate while said structure is being formed in said region of said substrate.

In one embodiment, the device according to the present invention, further comprises an analysis and control unit, which may be part of said voltage supply, comprising a current and/or voltage analysis circuit such as a trigger circuit, alone or as part of a user-programmed device, such as a computer, said current and/or voltage analysis circuit being capable of controlling voltage supply output parameters in relation to a trans-substrate voltage and current flow according to user-predefined procedures, such as turning off said voltage supply output once a user specified trans-substrate current threshold is exceeded, and/or said current and/or voltage analysis circuit being capable of controlling said means to apply energy.

Preferably, said voltage supply is a regulated voltage supply that obtains feedback signals from the process of forming a structure, such as for example current flow and heat, and subsequently adjusts the voltage parameters, such as amplitude, frequency, and duty cycle in a predefined, preferably user-defined manner, so as to produce the desired structure.

In one embodiment, said means to apply heat is an electric heating filament, preferably controlled by said control unit mentioned above.

In one embodiment, said means to apply energy, preferably heat, is a laser or other focussed light source or high energy radiation source or a flame, for example from a micro torch.

In one embodiment said means to apply energy, preferably heat is an AC voltage supply connected to said at least two electrodes, or, if present to further sets of electrodes.

In one embodiment said AC voltage supply is combined with said voltage supply mentioned above, to one single voltage supply, capable of generating an AC voltage component which can cause an AC current sufficient to heat said substrate and, preferably, to cause a dielectric breakdown through said substrate.

In one embodiment a distance between the at least two electrodes is in the range from 0.01 to 60 mm, preferably 0.1 to 15 mm and more preferably between 0.5 to 8 mm.

The device according to the present invention further comprises said electrically insulating substrate in a position substantially between said at least two electrodes and accessible to said means to apply heat.

In one embodiment the device according to the present invention, further comprises means to avoid electric arcs between said electrodes bypassing said substrate by ionizing the surrounding medium, e.g. air, such as rubber seals or glass plates tightly attaching to the substrate and effectively increasing the distance that an electric arc between the electrodes would have to take when bypassing said substrate.

In one embodiment the device according to the present invention, further comprises means for further modifying a surface of said substrate by a physical reaction initiated and/or maintained by the voltage and current used for forming said structure, or by a chemical reaction with an additional material that reacts with said surface of said substrate during the process of forming a structure.

In one embodiment said means for further modifying said surface of said substrate is a container for receiving said substrate and, additionally, a medium, such as a gas or liquid, surrounding said substrate.

In one embodiment the device according to the present invention, further comprises means to modify said structure formed, in a postprocessing step by heat application to said substrate such as to smoothen a substrate surface and/or to change the size of said structure.

In one embodiment the device according to the present invention, further comprises an electrically insulating substrate in which a structure is to be formed.

The objects of the present invention are also solved by an electrically insulating substrate having a structure or an array of structures produced by the method according to the present invention Preferably, said structure is a hole having an aspect ratio greater than 1, preferably greater than 5, more preferably >10, or wherein said structure is an array of such holes.

In one embodiment said substrate is made from a material selected from a group comprising carbon-based polymers, such as polypropylene, fluoropolymers, such as TEFLON®, silicon-based substrates, such as glass, quartz, silicon nitride, silicon based polymers such as SYLGARD®, semiconducting materials such as elemental silicon, wherein, preferably, said substrate is made from glass, quartz or silicon oxide or silicon nitride, or a mixture of any of the foregoing.

The objects of the present invention are also solved by a device comprising a substrate according to the present invention to support, capture or carry a biological object, such as a biological cell, or a lipid-based membranous object or structure.

In one embodiment of the device according to the present invention said substrate separates at least two fluid compartments which are accessed by electrodes in such a way that the fluid compartments are only connected through said hole of said substrate.

The objects of the present invention are also solved by a use of the substrate according to the present invention or the device according to the present invention for patch clamp measurements, black lipid membrane measurements, in micro fluidic devices, or for performing nucleic acid hybridization experiments.

The term "dielectric breakdown" (DEB) in the literature and in general refers to a voltage induced insulator—conductor transition in an electrically insulating material and consequently a current flow through such an electrically insulating material. One explanation for this phenomenon assumes atoms in insulating materials have very tightly-bound electrons, resisting free electron flow very well. However, insulators cannot resist indefinite amounts of voltage. But, unlike the situation with conductors where current is in a linear proportion to applied voltage, current through an insulator is very nonlinear: for voltages below a certain threshold level, virtually no electric charges will flow, but if the voltage exceeds that threshold, there will be a rush of current. Once current is forced through an insulating material, breakdown of that material's molecular structure has usually occurred. The thickness of an insulating material plays a role in determining its breakdown voltage.

Because of the complex nature of dielectric breakdown phenomena and the possible transition to electric effects, the term "dielectric breakdown" as used in this patent application and without wishing to be bound by any mechanistic explanation, is meant to signify any voltage induced electric/dielectric process leading to a change in the material structure of the substrate.

The term "controlled dielectric breakdown" (CDEB), as used herein, is meant to signify a DEB process under the precise control of the main process parameters, such as the properties of the applied voltage and the induced current over the entire process, leading to the formation of predefined substrate structures, such as holes.

The term "dielectric loss", as used herein, is meant to signify the transformation of electromagnetic energy into any other kind of energy, preferably heat, within the dielectric material.

The term "concomitantly", as used herein, is meant to characterise the relation of two processes as occurring together. It does not necessarily imply that the two "concomitant" processes begin and end at the same time; it only means that there is a temporal overlap of one process with another as they occur. In specific embodiments, however, "concomitant" is used synonymously with "synchronously".

The term "electric arc", as used herein, is meant to signify a plasma resulting from a current flowing through usually nonconductive media such as air or another gas. The arc occurs between two conductive electrodes and may produce high temperatures sufficient to e.g. melt glass.

The term "aspect ratio" is meant to characterise the ratio between the depth and diameter of a hole/recess/channel. Holes having a high aspect ratio are holes having a small diameter compared to their depth or height.

The use of controlled and thermally supported dielectric breakdown phenomena provides a new way of forming micro holes in insulating materials that serve as membrane/cell carrier.

Furthermore, the unique combination of simplicity, low cost, hole geometry and large choice of substrate materials makes the here described methods and production devices suitable for the application in many fields beyond electrophysiology.

The present invention provides devices and methods for the formation of micro holes in insulating substrates. The substrates are useable in many applications. The invention describes in detail their use for the controlled access to regions of biological membranes. The machined substrates are consequently applicable as replacement of e.g. standard patch clamp pipettes and BLM septa.

The invention uses the effect that under certain conditions at a critical electric field strength across insulating substrates a dielectric breakdown (DEB) occurs which creates a track through this insulator. Using strong electric fields allows to also perforate thicker substrates. However, since the transition insulator-conductor, causing the dielectric breakdown, usually occurs very suddenly at high voltages for practically interesting substrate thicknesses, a very steep increase in current across the substrate results. Without precise control of the current magnitude and duration, this current increase is usually too violent for the formation of small holes and other small structures. Furthermore, at voltages/electric fields sufficient to cause DEB under ambient conditions in rather brittle materials, such as glass, usually an irregular breaking of the substrate occurs, rendering the final substrate useless for most applications.

However, according to the present invention the current during DEB as well as the voltage application interval (and consequently current flow) after DEB onset is actively controlled (adjusted/limited) as part of a process feedback control so that the current and voltage driven melting/evaporation/removal of the substrate material occurs in a controlled manner. The DEB track and consequently the hole diameter can be reproducibly predefined. This allows to reproducibly form holes in the range of 1-10 um and possibly below, which has hitherto not been achieved. As an example of one embodiment of the present invention, perforating thin (kitchen style) sheets of polypropylene and polyethylene for BLM measurements with hole diameters below 10 um, at the voltages required for DEB the current was limited with a resistor in the range of 10 gigaohm to avoid the uncontrolled formation of much larger (>30 um) holes. Also the voltage duration after DEB was tightly controlled with a precision of ca. 1 ms. Depending on the substrate material and thickness, the required current limitation and voltage duration precision may vary. Since both parameters, voltage/field strength and maximum current, can be independently controlled, holes with high aspect ratios can be produced. (Note: The required voltage/field strength usually correlates to the substrate thickness, the current magnitude usually correlates with the hole diameter.) Controlling pressure and composition of the surrounding gas as well as the substrate properties (surface and bulk) during the DEB process provides the means for (quasi) simultaneous physico-chemical surface modification of the substrate due to the partial ionization of gas and surface components. This may be advantageous in cases where specific substrate surfaces are required for tight membrane adhesion.

At various places above, the present invention refers to "an electric field being sufficient to cause a dielectric breakdown" or "sufficient to give rise to an increase in electrical current". It is clear to someone skilled in the art that, for a given set of initial conditions, including an initial substrate heating, such conditions fulfilling this requirement can be easily determined for the respective substrate to be treated by simply gradually increasing the voltage of the electric field until the desired condition occurs, i.e. a sudden increase in electrical current through the substrate or a dielectric breakdown through the substrate. Similar considerations apply to the afore mentioned parameters of an applied AC voltage which are "sufficient to establish an electric arc between a surface of said substrate and said electrodes". The same also applies to the AC voltage "leading to dielectric losses in said region of said substrate, said dielectric losses being sufficient to increase the temperature of said region".

In many instances and embodiments of the present invention, heat is applied to the substrate, usually a local area of it, either by an external heat source and/or by the application of an AC voltage component which is transformed into heat. Such local area is herein often also referred to as the "region". Heating of the region in the aforementioned manner is such that its temperature increases to a value where at a practical and appropriate trans-substrate voltage the substrate material at a given thickness enters into an insulator-conductor transition. Due to the applied trans-substrate voltage, in many instances it suffices, that the initial heating is performed only until a DEB occurs, which generates sufficient heat to maintain itself and even to melt/evaporate/remove substrate material along the DEB path. These temperature-voltage combinations at which the insulator-conductor transition occurs are, of course, dependent on the individual substrate to be used, but can be determined in a straight forward manner by someone skilled in the art.

In the present application, sometimes reference is made to the structure being formed in the substrate as being a "cavity" a "hole" or a "channel". As used herein the term "cavity" is meant to signify a structure which can be described as a recess within the structure without actually extending through the substrate. In contrast thereto, this is the characteristic of a "hole" which essentially extends from one side of the substrate to the other side of the substrate. As used herein, the term "channel" and "hole" are used synonymously, with a "channel" usually referring to a hole structure that may be slightly more extended than a normal "hole", in that it may extend from one side of the substrate for a substantial length within the substrate, and only thereafter stretch to the other side of the substrate, if at all. As used herein, in one embodiment, "channels" are holes having a high aspect ratio.

In contrast to these trans-substrate channels, sometimes reference is also made to structures as being "channels" which are cavities that extend along a surface of the substrate, without actually stretching through the substrate, i.e. without stretching from one surface to another opposite surface.

The verb "to end", when used herein in connection with a process step, e.g. as in "step b) is ended" is meant to signify that such process step b) is actively ended under control by the user and/or upon the initiative and/or desire of the user. This is in contrast to an "uncontrolled finishing" of such step.

Because the invention resides, amongst others, in the use of heat and the application of an electric field together, it is clear, that substantial modifications can be achieved even after the desired structure has been formed, by continuing to apply heat and/or the electric field. In this context, the term "concomitantly" as used herein is meant to signify that substantial parts of the two processes (i.e. application of heat, application of an electric field) occur at the same time. The term "concomitantly", however, does not imply that both processes begin or end at the same time. For example, if, after the desired structure has been formed, the application of an electric field is interrupted, the application of heat nevertheless may continue and may result in a melting of areas around the formed structure, thus leading to a subsequent change of the geometry and size of the structure (for example a decrease of hole diameter, because molten material may fill in the formed hole again).

The invention also provides devices and methods for the formation of micro holes in materials usually not or difficult to machine by DEB such as glass and crystalline materials (e.g. quartz). Here the invention uses a combination of controlled heating of the substrate and CDEB to achieve holes and/or channels in the substrate. Focal heating of the substrate makes it possible to define precisely the substrate location where CDEB will take place. Varying the substrate temperature and temperature distribution provides additional means for controlling the hole and/or channel properties.

The invention further extends these CDEB methods by using alternating or modulated voltages for the hole formation. Causing the drop in electrical substrate resistance by heat contributed by dielectric losses inside the substrate material and/or electric arcs touching the substrate surface upon an application of an appropriate AC voltage, the CDEB process can be applied to materials with higher insulator—conductor transition temperatures and voltages, respectively (like glass), without an additional heat source. At the limit, the invention makes it possible to perforate substrates solely through AC voltage induced heat generation caused e.g. by electric and dielectric losses inside the substrate and electric arcs on the outside. However, (local) substrate heating preceding or being part of the initial phase of the actual CDEB process is controlled or seamlessly integrated into the CDEB as part of the invention such that at ambient temperatures usually brittle materials, such as e.g. glass, are sufficiently softened as not to break during CDEB.

An important advantage of the described CDEB methods and devices for controlled perforation is their applicability to most insulating materials. Because of the possible high aspect ratio of the produced hole structure as well as the large choice of materials, membrane carriers for e.g. Patch Clamp applications with excellent electrical as well as membrane adhesion properties can be easily, quickly and inexpensively made.

The foregoing and other advantages and features of the invention, and the manner in which the same are accomplished, will become more readily apparent upon consideration of the following detailed description of the invention taken in conjunction with the accompanying examples, which illustrate preferred and exemplary embodiments.

DETAILED DESCRIPTION OF THE INVENTION

Figure 1A:
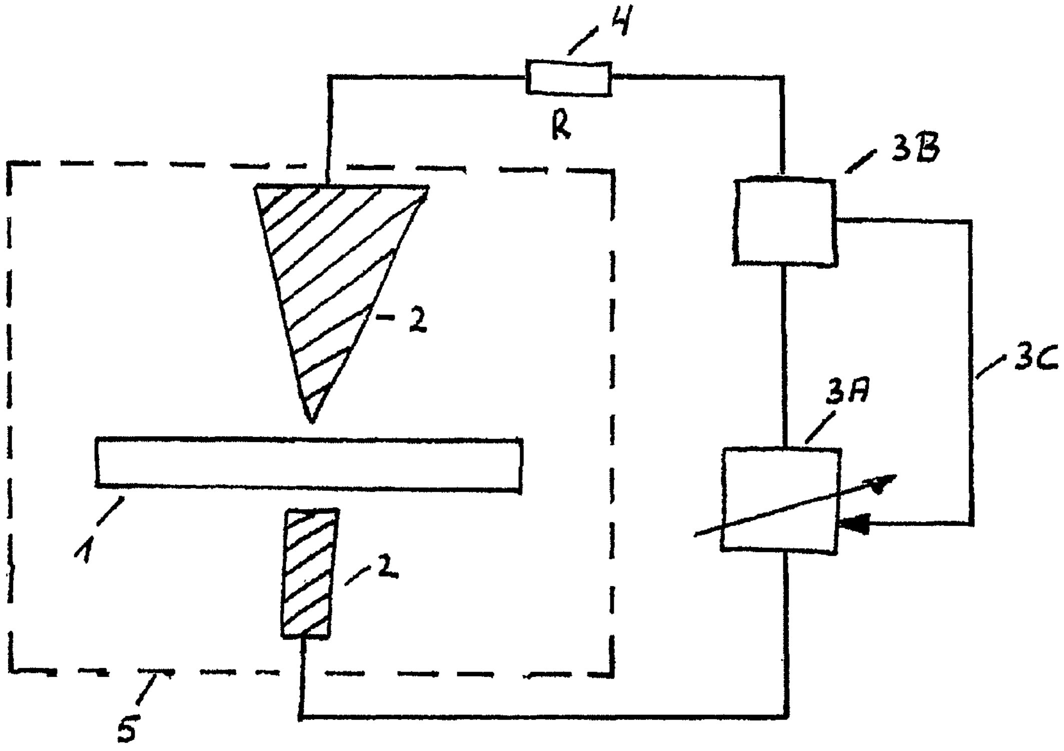
FIGS. 1A-D illustrates a typical embodiments of the device for CDEB perforation of this invention.

The device and methods of this invention can be used for the formation of hole and channel like structures in insulating substrates, in particular useful for electrophysiological and other measurements and set-ups where independent access to parts of biological membranes and cells is required. The terms "carrier" and "substrate" will be used synonymously and interchangeably throughout this patent application, with the term substrate referring more to the actual material to be micromachined and the term carrier indicating its actual function.

The formation of high aspect ratio hole (i.e. 'tunnel' or 'channel' like) structures in insulating or semiconducting substrates with current micromachining tools such as reactive ion etching or laser ablation is difficult, expensive and in most cases limited by size and geometry. However, for hole structures in insulating carriers used for the independent access of membrane parts, as e.g. patch clamp on a chip or BLM measurements, the precise location of the hole structure is less important compared to e.g. microelectronic circuits. Also, the hole diameter can vary within a rather large range (e.g. up to 50%) for the intended biological applications without significantly impacting the experimental quality and results. The possibility to form the hole or tunnel like structure at a largely arbitrary position at the substrate/carrier area reserved for membrane/cell access with only a roughly defined diameter provides the basis for the application of micro machining techniques that have lower precision than standard micromachining techniques. However, the generation of high aspect ratio holes in substrates not amenable to micromachining techniques, such as glass or quartz, have remained a formidable engineering challenge until the advent of the present invention.

A physical phenomenon that can be used to form small holes with high aspect ratio, but lacks otherwise high precision required for e.g. microelectronics, is "dielectric breakdown" (DEB). This phenomenon occurs in insulators in electric fields (e.g. insulators sandwiched between two electrodes) when the applied voltage and electric field strength, respectively, increases to values where an "insulator-to-conductor" transition occurs. Due to Ohm's law I=V/R (I . . . current, V . . . voltage and R . . . resistance), a sudden increase in current, and consequently power dissipation $P=R\times I^2$, between the electrodes and through the insulator is caused by a significant reduction in electrical resistance. Along the current path insulating material is transformed or removed (e.g. by burning, evaporation or material ejection) which can lead to the appearance of cavities, hole or tunnel like structures. This phenomenon is known for decades and mostly a parasitic effect in high voltage circuits or sensitive electronic components as e.g. FET transistors (gate electrodes). It has also been used in industrial environments to e.g. perforate thin plastic packaging sheets to permit gas exchange. Because it appears difficult to separate between the various effects high voltages of different frequencies exert on dielectric materials, in this patent application the term DEB is used for all voltage induced electric/dielectric processes leading to a local (if locally applied) change in the material structure of the substrate. In particular, this concerns local increases in substrate temperature upon voltage application, which can be used to visibly modify the substrate material. For the primary applications in electrophysiology, these modifications will be hole formations.

DEB has been used in the past for the formation of small holes (ca. 20-50 um minimum) in plastic substrates for BLM measurements. However, due to the employed DEB devices and methods, which did not allow for a precise power control (i.e. control of voltage, current magnitude and duration) during and after DEB, micro holes with reproducible diameters below 20 um were not achieved. But micro holes significantly below this diameter are required for carriers for patch clamp like measurements (cell size usually <25 um) and stable and commercially usable lipid membrane (Note: the BLM stability is inversely correlated to the membrane diameter) devices. Until now, it is not known that DEB has been used before in a precisely defined and controlled manner for reproducible micro-structuring of insulating substrates intended to carry small (i.e. less than ca. 10-15 um) biological membranes or objects thereof at the micro-hole site.

To manufacture holes and other structures within a defined range of spatial dimensions by DEB, the energy dissipation during and after DEB, according to the present invention, must be accurately controlled (controlled DEB or CDEB). Because the dissipated energy is the product of current times voltage times duration, all three factors are controlled. FIG. 1A shows a possible realisation, in which the voltage is controlled by a process controlled and optionally current limiting high voltage power supply. Depending on the properties/control characteristics of the voltage source, the current may also be limited by an optional resistor R, which is in series with the substrate. This has the advantage that for a not sufficiently fast power supply control or parasitic capacitances which may render the control of the power supply not fast or precise enough, the maximum current during CDEB can not exceed I=V/R, with V indicating the amplitude of the applied voltage. The CDEB duration and consequently voltage application is e.g. set by a timer which is triggered at a preset trans-substrate current level usually indicating the onset of the DEB process. The onset of the DEB process is indicated by a very steep and strong current increase. Because of the exponential nature of this current increase during DEB, CDEB requires a fast trigger. In some embodiments it is sufficient to use a somewhat slower trigger control/power supply control in conjunction with a current limiting resistor R (see above) because the exponential current rise is limited by the resistor to a preliminary value of I=V/R limiting the power dissipation and consequently tending to increase the CDEB interval. However, this method works preferably for polymers and similar materials. For all presented data in this application, the trigger speed and consequently time control precision of the CDEB process was in the range of 0.1-1 ms for non-critical CDEB processes (i.e. low DEB energies) and 1 nsec-100 usec for high DEB energies. A possible realisation of a suitable high voltage source is illustrated in FIG. 2. Low DEB energies refer to maximum trans-substrate currents usually in the range and below $10^{-5}$ A.

Figure 3A:
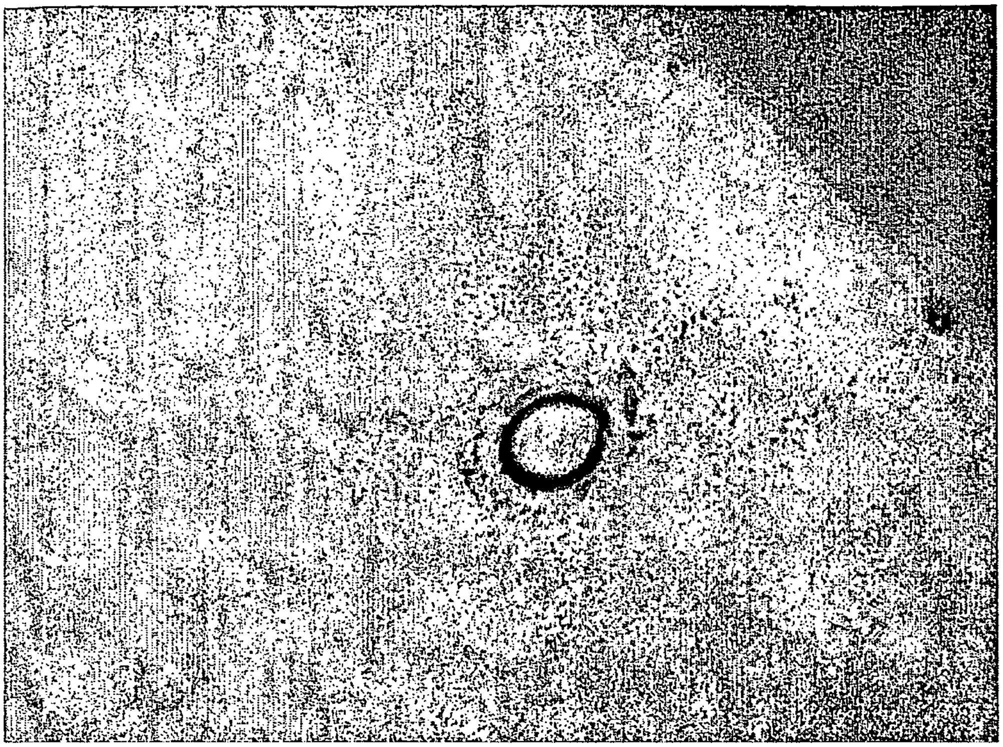
FIGS. 3A-G shows microscopic images of micro holes formed in polypropylene and glass substrates and corresponding current-voltage curves as well as a typical time course of current and voltage during processing.
Figure 3A:
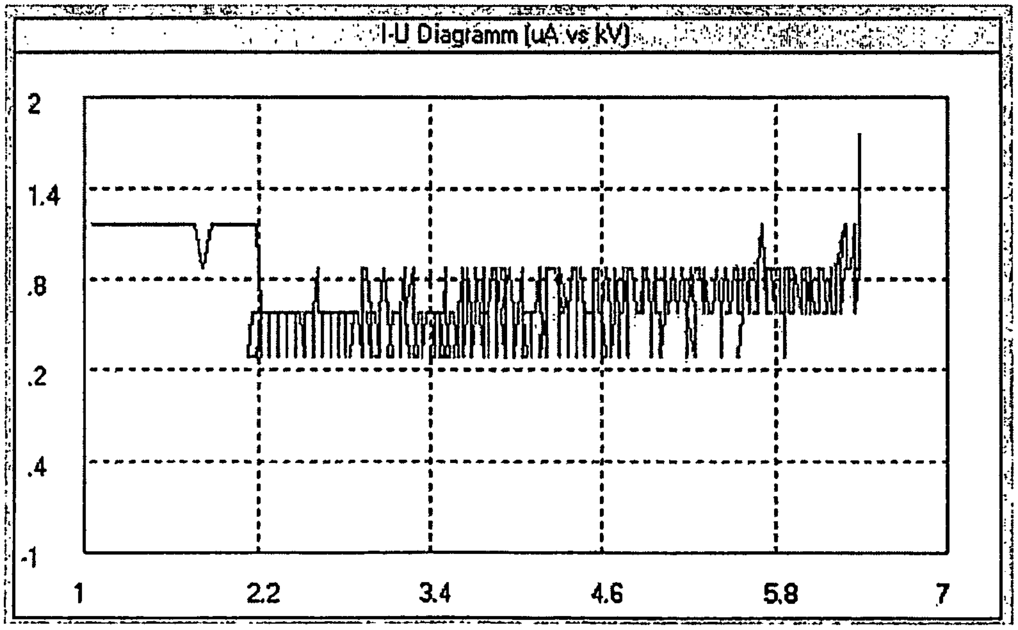

FIG. 3A shows a micro hole formed with CDEB in polypropylene (upper panel) as well as the current-voltage trace recorded when the trans-substrate voltage was raised to the critical DEB value (lower panel). Smaller holes (diameter <1 um) were consistently produced by further limiting the current upon an increase in the series resistance R.

The distance between the electrodes and carrier to be structured can be varied. If the electrodes touch the substrate ('contact mode'), the necessary DEB voltage is reduced to a minimum. However, contaminations and mechanical influences on the substrate deriving from the electrodes may occur. Using a gap between the substrate material and the electrodes may increase the necessary DEB voltage, reduces however the risk of electrode interferences with the substrate surface.

A gap between substrate surface and electrode allows for the ionization of the gas molecules between them, providing the means for a modification of the substrate surface through activated gas molecules. For this the gas composition between the electrodes and substrate is controlled in such a way that during DEB the ionized gas molecules interact with the substrate surface in a manner beneficial for the intended application (e.g. cell adhesion). An example is the usage of pure oxygen which leads to the generation of activated oxygen molecules/ions/radicals during DEB which in turn can oxidize the substrate surface. Another way to concurrently modify the surface during DEB is the prior coverage of the surface with materials that, upon the ionization and heating process during DEB, undergo a chemical modification beneficial for the application of the substrate (e.g. for better membrane adhesion). The surface properties of the CDEB formed hole and its surroundings can also be controlled by selection of a substrate material that during DEB is fully or in part transformed into a material of choice.

The electrodes can be surrounded by an insulating material such as PDMS (polydimethyl siloxane) that also tightly seals to the substrate surface. This avoids DEB process bypassing the substrate and going through the adjacent medium (e.g. air) and consequently allows to structure also substrates with small total surface areas. Another possibility of avoiding DEB processes bypassing the substrate is the usage of substrates surrounded by media that have a much higher breakdown voltage than the substrate material itself (e.g. silicon oil). The electrodes may also be surrounded by liquids of various dielectric properties (e.g. water, dichloromethane) to modify the DEB outcome as well as to modify the temperature distribution at the structuring site.

The classical DEB method as well as the here described CDEB method still lack the ability to perforate most substrates of interest, e.g. substrates that do not easily melt/burn, have crystalline structures, are to brittle or require DEB voltages that are not useable for substrates in practice (glass, quartz). In order to make CDEB accessible to such materials, the necessary DEB voltage must be decreased or at least modulated and, in some cases, material properties must be changed or initialized before the actual DEB hole production process takes place so that the material is e.g. soft enough as not to break during hole production (e.g. glass). In theory, CDEB structuring can be applied to essentially any insulating material, since all insulators show at some specific electric field strength a full or partial transition into a conducting state. Consequently, a wide selection of substrate materials ought to exist allowing for an optimal selection of substrate/carrier parameters such as membrane and cell adhesion and electric/dielectric properties for e.g. Patch Clamp on a Chip applications.

To extend the CDEB method in general to become applicable in practice to many substrate materials of interest in biology, physics and technology, the reduction of the insulator-to-conductor transition field strength by raising the substrate temperature is a central part of this invention. Heating the substrate, either extrinsically with an additional external energy source or intrinsically by e.g. dielectric losses caused by AC voltage components before CDEB takes place, can both sufficiently reduce the required DEB voltage and alter the material properties so that materials, where the dielectric breakdown point is usually difficult to achieve or side effects come into play, can be microstructured. To additionally better define the CDEB process location at the substrate, heating can be locally restricted. Heating the substrate or usually parts thereof in a defined manner makes materials accessible to CDEB that usually can not be modified at a useable thickness or that tend to break because of brittleness at normal (ambient) temperatures. For instance, making round holes in glass cover slides (e.g. Menzel S1) by 'normal' CDEB is virtually impossible due to the required high voltages and also the breakage of the glass slides once DEB takes place at these high voltages; injecting an appropriate amount of additional heat at the intended CDEB site reduces the electric resistance sufficiently to initiate DEB leading to round and largely smooth holes in the slide. An intended effect of this method is the production of high aspect ratio holes. Because the necessary DEB voltage is lowered by heat injection, relatively thick substrates (compared to e.g. reactive ion etching) can be structured. Aspect ratios larger 100 in materials such as glass (e.g. Menzel S1) are possible and have been achieved according to the present invention. It is also clear that not only heat but essentially any kind of energy lowering the voltage at which the "insulator-to-conductor" transition (DEB) takes place can be applied to support the CDEB process. In particular ionizing radiation also promises to lower the DEB voltage. The invention considers and claims the use of high energy radiation in order to lower the electrical resistance of the substrate material and to consequently induce DEB at practical voltages. Examples are x-rays and ion beams.

Lowering the voltage required for DEB also reduces the rate with which electrical energy deriving from the applied voltage (source) is transformed into heat during DEB ($P=V^2/R$, where R is mainly the resistance of the substrate, which is likely to drop even faster with increased voltage due to faster heating during DEB). This moderation of energy injection into the substrate is important to e.g. avoid excessive thermal expansion of regions of the substrate or melting/burning of organic substrates. In particular for brittle materials such as glass this may contribute in avoiding an unspecific breaking of the substrate.

Figure 1B:
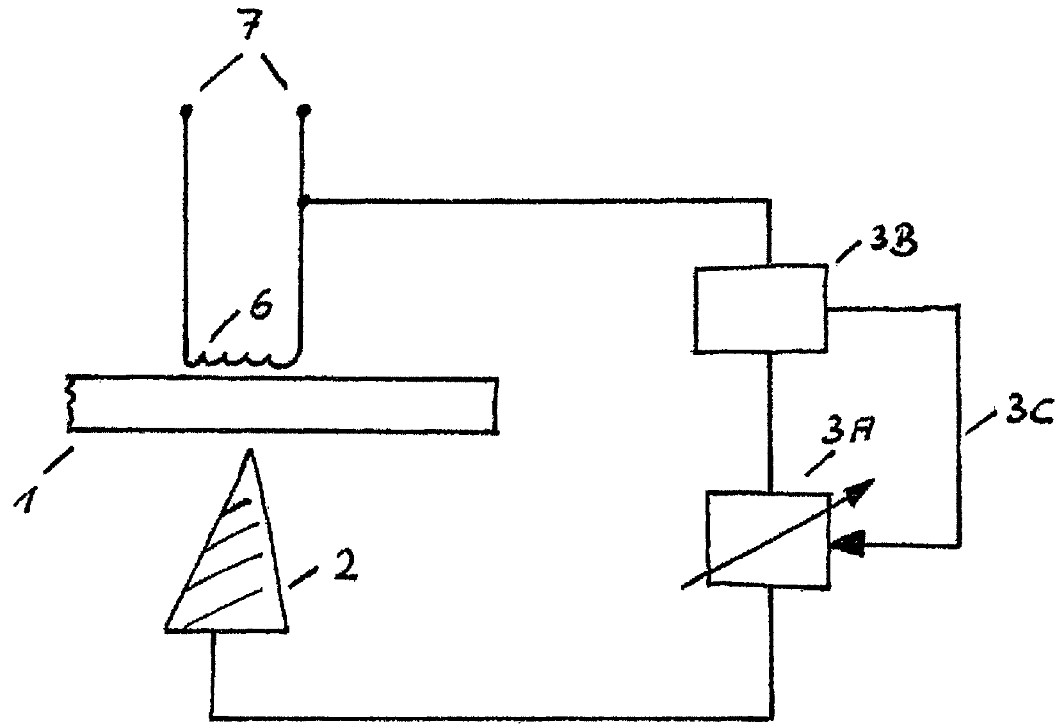
Figure 1C:
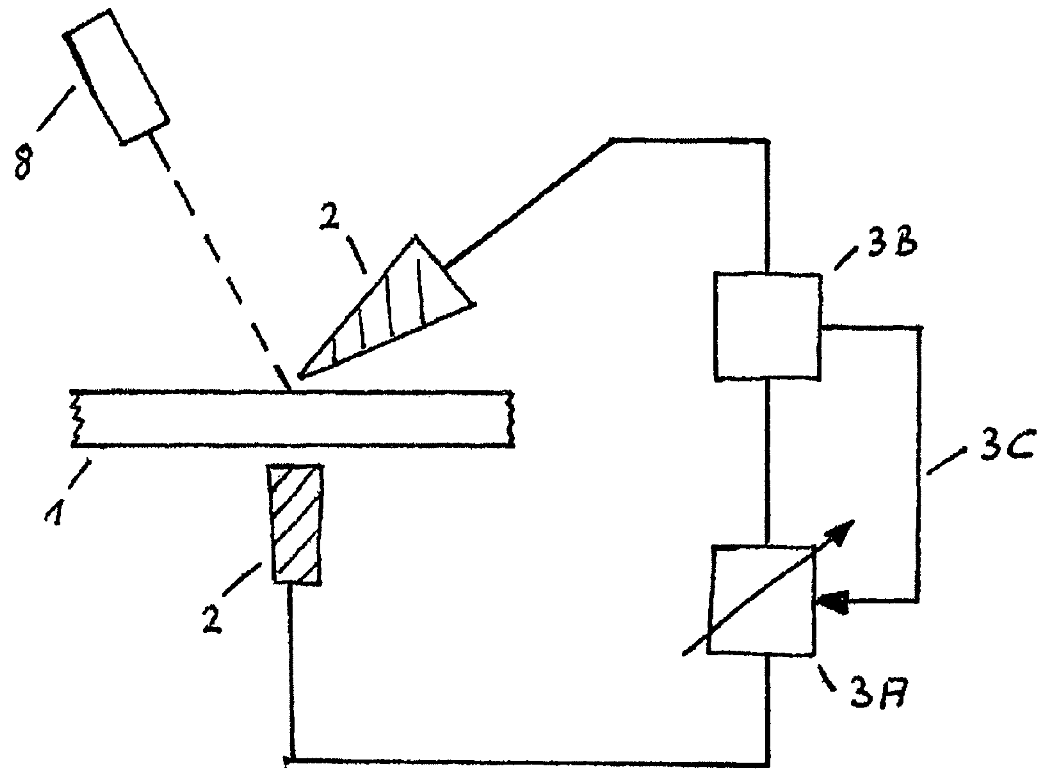
Figure 1D:
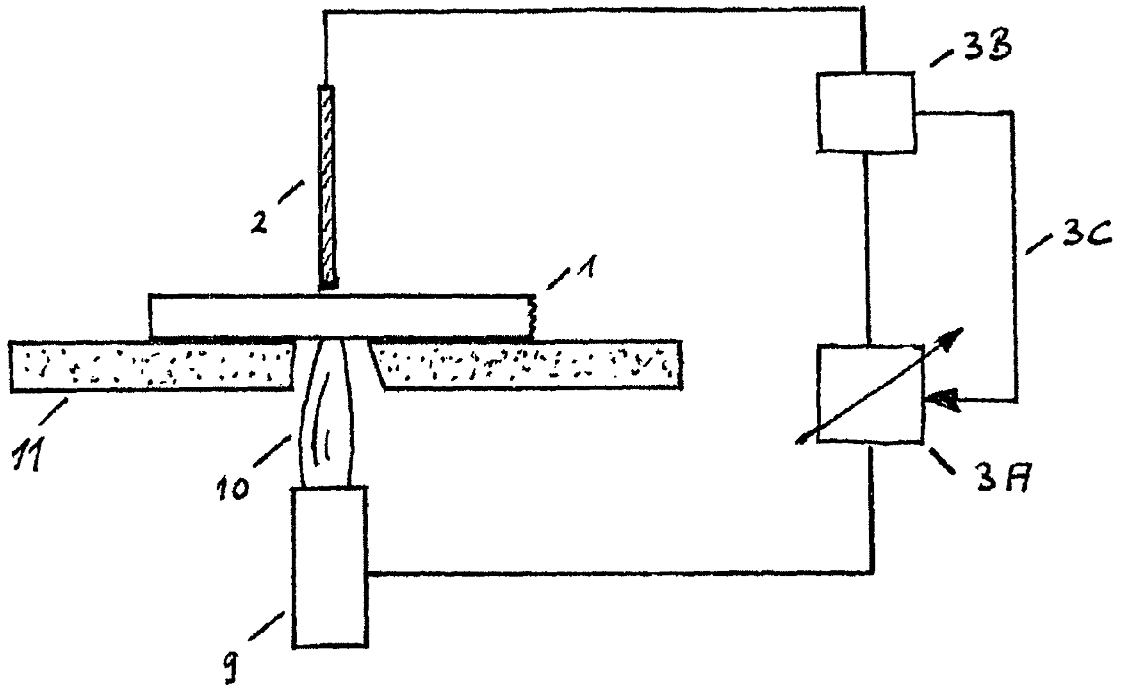

The invention claims the particular use of this thermally supported DEB process. For materials difficult to perforate by DEB under ambient temperature conditions, such as e.g. glass and quartz, a heat source is added to the perforation device (FIGS. 1B, 1C, 1D). We refer to this method as extrinsic heat supported CDEB. Heating the substrate can achieve the following: (I) softening (if necessary up to the point of melting) of the substrate material or parts thereof (II) reduction of the necessary DEB voltage caused by a lowered electrical resistance of the substrate.

The heat and energy source, respectively, can inject energy/heat in different ways. It is possible to apply energy/heat from one or both sides (referring to the position of the electrodes) of a substrate. Various heat sources are suitable, e.g. lasers (FIG. 1C, e.g. infrared laser for glass), heating filaments (FIG. 1B) and flames. Due to the fact that flames consist of (partially) ionized gas molecules and consequently have a higher electrical conductivity than cold gas (e.g. surrounding air) they can be used as an electrode for the voltage application during CDEB (FIG. 1D). For this reason a metal or other electrically conducting part which is in contact with the flame (e.g. the metal opening of the burner releasing the flame) is connected to the DEB voltage source.

The invention claims the use of directed and locally restricted heating of the substrate with the goal to induce only locally the above described heating effects on the substrate material and consequently direct the location of the CDEB process on the substrate. As an example, the flame of a gas burner is focussed and positioned at the substrate surface where the hole is to be formed (FIG. 1D). Similarly a laser spot can be positioned at the substrate surface (FIG. 1C). The combination of high precision laser spot positioning and normal CDEB defines a device and method for high precision CDEB micro-perforation.

Figure 3B:
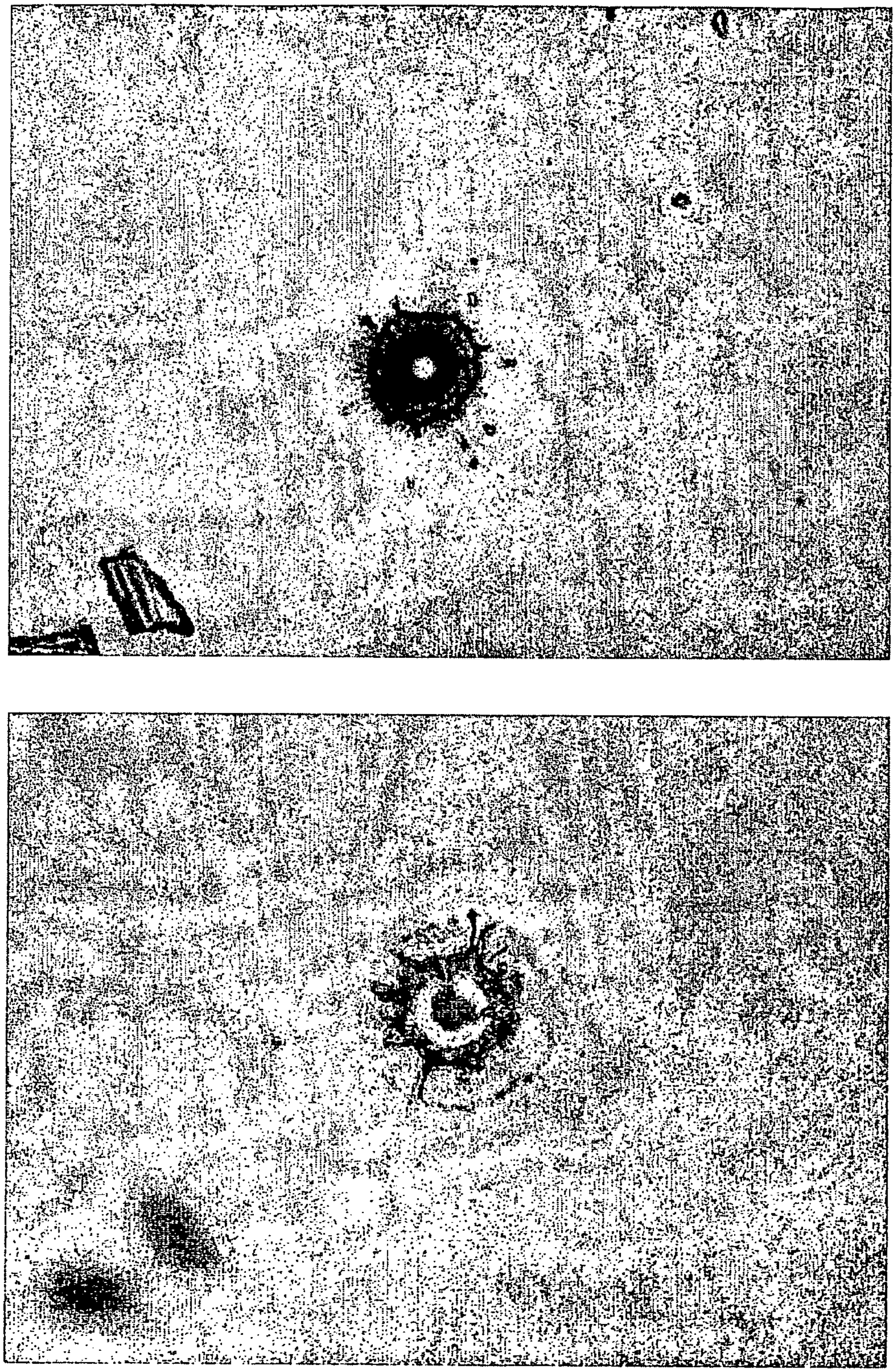
Figure 3C:
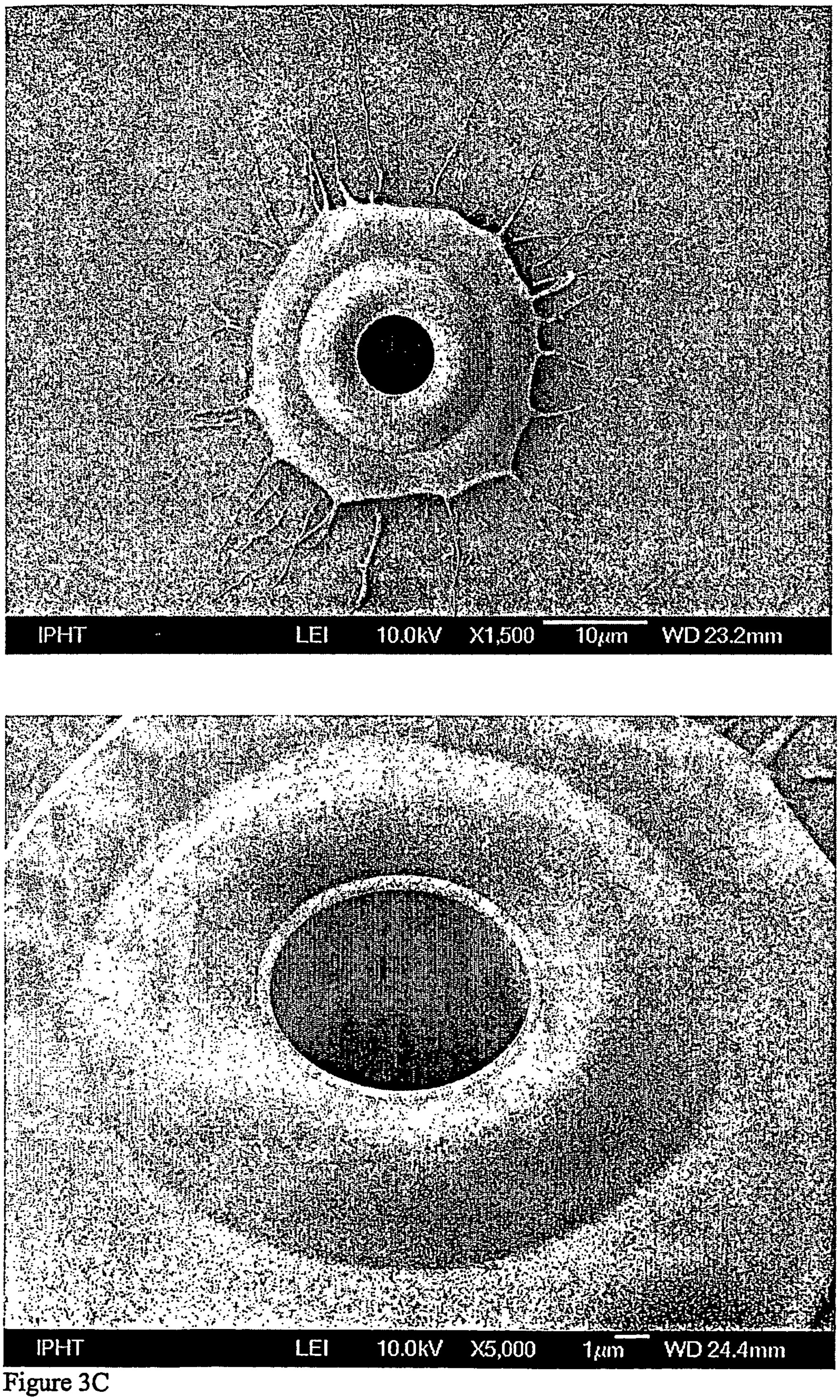

The invention claims that (locally) adjusting the substrate temperature to specific levels or ranges is a way of controlling the hole/channel properties. This becomes immediately clear considering e.g. the differences in viscosity, surface tension and electrical resistance of the substrate material at different temperatures. Also the control of the heat distribution across the carrier is an additional method to modulate the CDEB outcome on the hole/channel properties. Appropriate ways of controlling the heat distribution involve the size and placement of the heat source (e.g. heating filament size and distance to the substrate surface), the amount heat coupling from the heat source into the substrate per time unit as well as the duration and possibly modulation of the heat application. In tests it was observed that changing the distance between the heating filament (1×1 mm2 active area, FIG. 1B) and the substrate surface (Menzel S1) by only a few micrometer (total distance filament—substrate surface ca. 100 um) would significantly shift the amount and distribution of the heat igniting the actual DEB process (voltage set prior to heat application to ca. 8-20 kV) and consequently the outcome of the entire DEB process, ranging (with all other parameters fixed) from no holes in the substrate to perfectly round holes. At short distances (ca. 25-80 um), holes appeared mostly round (FIG. 3C). At distances of significantly more than 100 um, the Pt heating filament had to be excessively heated for DEB initiation so that metal depositions appeared at the substrate surface. In most cases, metal depositions are not wanted and this distance can be used to define the largest useful distance. Of course, if for certain applications metal depositions are wanted, the deposition process can be combined with the CDEB process. Furthermore, the substrate may be 'clamped' at some locations to certain constant heat reservoirs to maintain the desired heat distribution.

An additional function can be assigned to substrate heating and is part of this invention, which may occur either by an extrinsic heat source or an appropriate trans-substrate/trans-hole current generated after CDEB. Applying the heat beyond the dielectric breakdown, the produced structures can be post-processed by melting/annealing/tempering. This is an appropriate way to e.g. change the diameter of CDEB produced holes, to smoothen the surface roughness inside and outside the hole mouth or to eliminate mechanic tensions of the material surrounding the hole. In tests, the hole diameter could be reduced up to a factor 1.6 (as determined by conductance measurements in saline solution) by such a prolonged heat application.

Substrate heating and CDEB can be combined in various ways to achieve the desired holes/channels and surface properties. The invention uses most commonly: (I) heating of the substrate to a preset value and consequent application of the DEB voltage and (II) application of a specific DEB voltage and heating of the substrate until DEB occurs. In both cases, heat and voltage may be reduced after DEB with or without a delay in a way suited for the CDEB process, e.g. abrupt reduction or 'fading' out. In fact, by controlling voltage and current after the actual CDEB, the formed structures may be post-processed. For instance, the heat produced by the electric arc passing the substrate at a hole site modifies the hole by melting surface material. That way, the structure itself as well as its surface properties can be modified.

A very simple and elegant way of combining substrate heating source and DEB source is the use of a single modulated or alternating voltage source. We refer to this method as intrinsic heat supported CDEB. In this case, a method consists of at least two components: (1) local heating of the substrate through (1A) dielectric losses of the substrate material induced by a changing voltage/electrical field across this substrate region and/or (1B) through electric arcs forming between the electrodes and substrate surface and (2) DC voltage induced normal CDEB. A suitable device employing this method can consist of only two electrodes, which are connected to a controlled voltage source providing the necessary AC-DC voltage superposition as well as any kind of a sufficiently insulating mechanic support for the substrate (FIGS. 1A and 2). For standard microscopic cover slides (Menzel S1 18×18), DC voltages of 0-15 kV and AC voltages of 10-40 kV and 4-100 kHz were commonly used to prepare micrometer sized holes (usually 1-7 um). The electrode distances (e.g. a pointed Pt-wire 0.5-2 mm in diameter) were usually 0.5-3 mm. Other parameters (e.g. higher frequencies) work as well but were outside the voltage supply limits. The dielectric losses and consequently heating of the substrate material are determined by factors such as duration, frequency and duty cycle of the AC component of the applied voltage, voltage amplitude and dielectric material properties. Even in the absence of dielectric losses, the invention claims the use of electric arcs forming at sufficiently high AC voltage amplitudes and frequencies capable of heating localized substrate areas sufficient for DC voltage supported DEB hole formation. Without wishing to be bound by any theory, the rational behind this method is that with increasing frequency, the impedance across the substrate drops due to an increase in capacitive currents Ic according to the equation: $I_c=C*dV/dt$, where C is the capacitance of the substrate-electrode assembly and dV/dt is the voltage change per time. Consequently, the voltage drop across the substrate is reduced with increasing frequency. For a given voltage amplitude this leads to a higher voltage drop outside the substrate. However, since the (usually) gas molecules outside can be much more easily ionized than the substrate material in most cases, the gas ionization at sufficient voltages leads to the formation of electric arcs between the substrate surfaces and the electrodes. These electric arcs are often hot enough to gradually melt and sometimes remove the substrate material they are touching.

It is crucial for all thermally supported CDEB processes and part of this invention, that substrate material at the structuring site is sufficiently softened or even molten before the actual hole producing CDEB step takes place. We refer to this step as heat initialization. In particular for brittle or crystal materials this becomes important. If this is not taken into account, the substrate may break because of brittleness (usually at the structuring site) and become unusable. However, even without proper heat initialization, the voltages can sometimes still be raised until DEB occurs, usually causing material to break out of the substrate, forming a brittle structure not useable for most applications. For instance, this can be observed when placing a thin glass slide between closely spaced high voltage electrodes (e.g. electrode distance <0.2 mm to substrate, substrate Menzel S0/S1 cover slide) and the voltage is raised to the point of DEB without any heat application (usually in the range of V ca. 30,000 V (DC)). Proper heat initialization, either by extrinsic or intrinsic heat sources, is therefore central to all described methods and devices when high voltages are applied that can also break the substrate material. This unwanted process breaking process is frequency dependent and has been observed to become more likely with decreasing frequency. It is important to notice that parameters for intrinsically heat supported CDEB can be chosen in such a way, as part of this invention, that heat initialization and the actual CDEB perforation step move seamlessly into each other, i.e. the onset of the CDEB process is chosen (controlled by preset parameters such as voltage amplitude and frequency and modulation) to serve as heat initialization. This allows for a much reduced effort in process control.

A special and very useful realisation of this invention is the usage of alternating or modulated voltages with no or only small DC components for CDEB. In such a case, an AC voltage is applied across the substrate region to perforate. Without wishing to be bound by any theory, the dielectric losses of the substrate upon this AC field/voltage application and/or the electric arc which may form lead to such a strong local substrate heating that a hole can form through the substrate (i.e. essentially pointing from one electrode to the other). The actual hole causing process usually occurs through thermally induced very sudden volume increase as well as evaporation of the substrate material, which in turn leads to an 'ejection' of liquid and gaseous substrate material out of the forming hole structure. As described before, in many cases parameters must be also controlled in such a way as to delay the hole producing step until the substrate material is soft enough. Only for this timing, it concerns in particular voltage amplitude and frequency/duty cycle. For standard Menzel S1 18×18 glass cover slides AC voltages of ca. 20,000 V, wire electrode distances of ca. 0.5-6 mm, and frequencies of 2-100 kHz were successfully tested for substrate perforation. Perforation times varied between ca. 10-600 ms. Other frequencies and voltage amplitudes are certain to work as well but were outside the limits of the perforation device/setup that was used. However, for most parameter sets it is important to tightly control the duration during which current flows through the substrate. In particular, after formation of the hole, which occurs in a sudden manner, the now increasing current must usually be immediately reduced or fully turned off to avoid a further temperature increase of the substrate surrounding the hole, which may lead to a closure of the hole by molten substrate material. In practice it is favourable to not only apply a constant AC voltage but to apply it intermittently, that trains of AC voltage intervals with adapted parameters (e.g. duty cycle and frequency that also may be adapted/changed during the pulse train) in order to control the perforation process so that no cracks and other unwanted structures form inside the substrate. For standard microscopic cover slides (Menzel S1), trains of 1-30 pulses of 10-400 ms duration separated by 0-200 ms off-time were commonly used to prepare micrometer sized holes. Typical AC voltages were between 10-20 kV with frequencies of 10-70 kHz and varying duty cycle (typ. 25-75%). The fast trigger (10^−7 sec delay) for pulse termination was usually set at trans-substrate currents between 0.1 to 100 nA, preferentially 1-20 mA. These current values could not be directly measured but were estimated. The highly precise trigger control itself used experimentally determined and interpolated current values expressed in random units. Also a temporal variation of these parameters during the pulse train (e.g. the subsequent pulses of the train differ in AC power and frequency and trigger current) is possible and has been successfully applied. For example, reducing the AC frequency from 60 kHz to 20 kHz during the pulse train improved the hole quality. Also, pulse trains were applied repeatedly, with each train termination triggered by DEB onset (i.e. trigger current level reached), yielding very small (diameter <2 um) and open holes in e.g. Menzel S1 glass slides. With the same cover slides it was observed that only at 'parameter islands' open holes were produced. In between, holes were probably closed by tiny amounts of molten glass moving into the center of the hole, probably by surface tension. As stated before, also with this particular method CDEB parameters can be chosen such as to combine heat initialization and perforation step.

To avoid cracks in the substrate forming after hole formation all CDEB methods can be combined with an additional tempering step. After hole formation, large mechanical tensions can form inside the substrate (e.g. with glass) at the hole location. Moving the substrate temperature up, e.g. in the range of the substrate softening temperature, usually reduces these tensions rendering the substrates long term stable and widely applicable.

Increasing the frequency of the AC voltage component is a method to better define the location of the forming substrate hole. This becomes immediately apparent considering the fact that the capacitive current component of the current flowing between the perforation electrodes increases with increasing frequency while the ohmic current stays essentially unchanged so that the overall current, which is increasingly dominated by the capacitive component, follows the direct way between the electrodes, more and more unaltered by ohmic obstacles. Since the capacitive current does not necessarily follow the ohmic path (i.e. lowest ohmic resistance), already existing holes or cavities and other structural or material property inhomogeneities lead to lesser deviations of the current path and consequently to a more precise hole location with increasing frequency. This extends the method to multiple perforations of one substrates with holes closely spaced. For applications in micro fluidics, biotechnology etc, which may require e.g. arrays of closely spaced cavities (e.g. for reaction chambers), the usage of higher AC frequencies leads to a method suited for the production of e.g. high density arrays of micro cavities and other structures (e.g. surface channels) suited for applications in these fields. To produce surface channels and cavities for such applications (instead of holes), the CDEB process is either terminated before full opening of the hole or prolonged so that the hole is closed again with molten substrate material. Moving the substrate during CDEB leads to the formation of channels. For these latter purposes the intrinsically heat supported CDEB method is clearly preferred.

Figure 4:
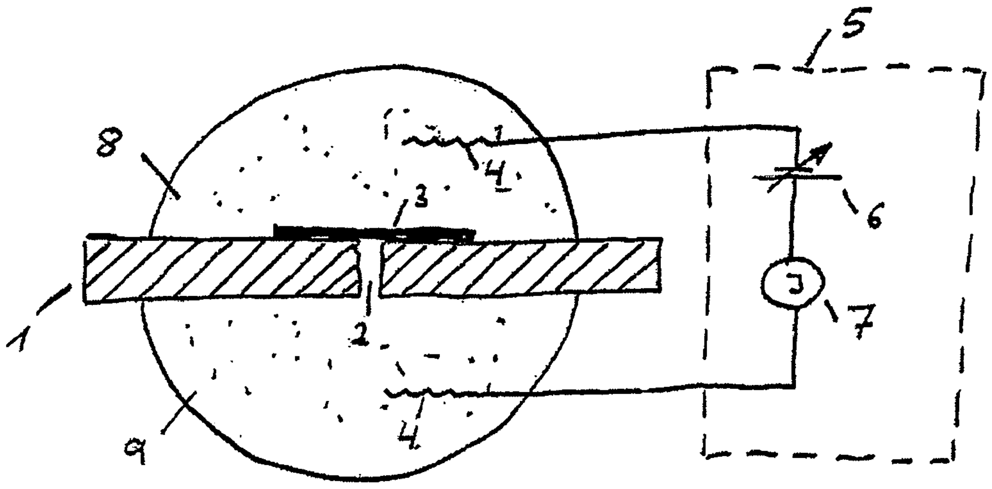
FIG. 4 illustrates an embodiment of a device used for electrophysiological measurements with biological (lipid) membranes using the carrier device of this invention.
Figure 5:
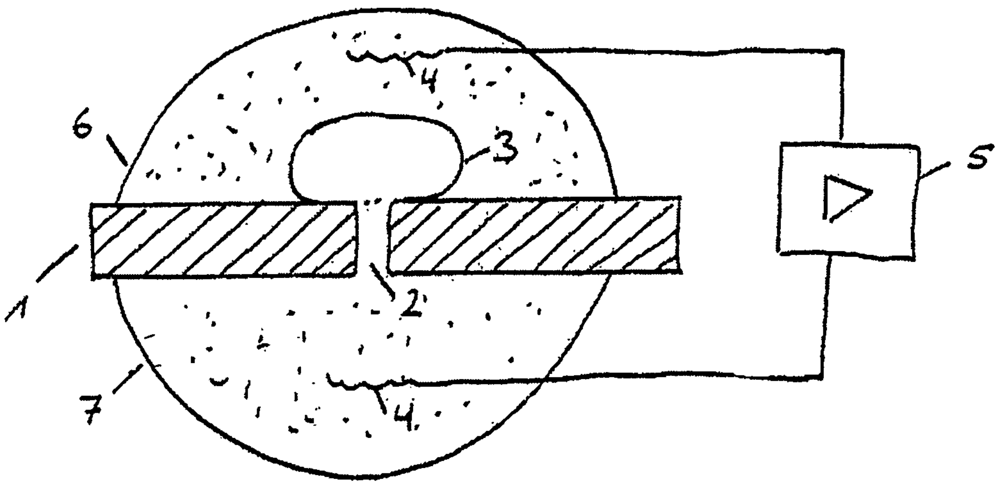
FIG. 5 illustrates an embodiment of a device used for electrophysiological measurements with biological cells using the carrier device of this invention.

The combination of micro-structured carriers made by thermally supported CDEB with the means for electrophysiological measurements provides the basis for new and inexpensive devices monitoring electrical currents through biological membranes. Here the carrier separates two or more fluid compartments that are only connected through the CDEB produced hole. The biological membranes to be analysed are placed on one side of the carrier across the hole sealing it tightly. FIG. 4 illustrates the usage of a CDEB micro structured carrier as support for an artificial lipid membrane in a BLM set-up; the lipid membrane is usually provided by a giant unilamellar vesicle positioned at the hole opening. FIG. 5 illustrates the usage of a micro structured carrier, processed by thermally supported CDEB, as support for a patch clamp type set-up with biological cells. For such measurements it is required that membranes adhere tightly (forming so called 'giga seals') to the surface of the carrier thus avoiding leakage currents bypassing the biological membranes. Microscopy glass cover slides have shown to work well as basic carrier/substrate material. After tight membrane sealing, currents measured across the carrier (usually in voltage clamp mode) provide insights in membrane properties, in particular about the embedded ion channels and their control and interaction with e.g. other molecules and the applied voltage.

DESCRIPTION OF THE FIGURES

FIG. 1A is a schematic diagram (side view) illustrating an embodiment of a device for CDEB based manufacturing of defined micro structures such as holes, consisting of the insulating substrate material to be structured (1) between electrodes (2); the electrodes can have various forms (2) and distances to the substrate material; the electrodes are connected to an adjustable and process controlled high voltage source (3); the latter consists of an adjustable voltage source (3A) receiving feedback (3C) from a current monitor (3B) that modifies, that is, usually disables, voltage source output after a preset delay (delay usually zero or near zero) once a specified trans-substrate current (or current pattern) has been reached (DEB onset). Trigger level and voltage source properties are usually set or programmed by the operator. An optional series resistance R (4) may be connected in series with the electrodes to limit the current during CDEB. A series resistor is particularly useful when only very small currents are permissible for substrate perforation and stray capacitances and/or timing of the voltage source render the precise current control difficult and imprecise, respectively. In the most basic CDEB set-up, the voltage source usually controls the CDEB process in such a way that the maximum current and the duration of current flow after DEB onset is adjusted. DEB onset can be detected in various ways; most suitably, DEB is usually detected by a trigger monitoring the trans-substrate current. In a preferred embodiment, a steep increase in this current by usually more than one order of magnitude indicates DEB onset. The substrate material and electrodes may be surrounded by a controlled gas composition and pressure (5).

FIG. 1B illustrates an embodiment of a device for extrinsically heat supported CDEB. Heat is supplied by a heating filament (6) controlling the substrate temperature. For simplicity, the heating filament also serves as counter electrode (6). In this example, the electrode (6) is directly heated by an electric current applied to terminals (7). For practical reasons the heated electrode was connected to ground while the opposite electrode supplied the voltage ("hot" end). The electrode (6) can also be indirectly heated by surrounding the electrode with a suitable heating element. One realisation used to produce holes of 1-10 um diameter in Menzel S1 cover slides consisted of a feedback controlled 0-30 kV, 0-300 uA voltage source, connected to a 0.1-2 mm Pt-wire electrode on one side of the slide (distance ca. 0.1-0.8 mm) and connected to a Pt heating filament (1×1 mm2 active area) ca. 0.05-0.5 mm from the other side of the slide. During perforation the cover slide was mounted on a perforated glass/ceramic slide allowing electrode access to the cover slide from both sides. The voltage source (3) was controlled according to the description of FIG. 1A. The CDEB voltage amplitude was chosen not to cause DEB on its own; DEB was initiated by the application of a short but controlled heating voltage/current to terminals (7), the latter usually automatically applied after reaching a preset voltage as part of a microprocessor based process control. A typical I-V time course of a perforation is shown in FIG. 3E.

FIG. 1C illustrates an embodiment of a device for extrinsically heat supported DEB. The substrate temperature is locally controlled by a laser (8, beam indicated as dashed line). Additionally, a pyrometer can be used to supply feedback to the laser for precise substrate temperature adjustment. After CDEB voltage application, DEB is initiated by a short 1 laser pulse. The voltage source (3) is controlled according to the description of FIG. 1A.

FIG. 1D illustrates an embodiment of a device for extrinsically heat supported DEB based on a device as in FIG. 1A (resistance omitted for simplicity) with a modified electrode (2). One electrode (2) is replaced by a burner (9) focussing a flame (10) onto the substrate surface. Undesired global heating and deformation of the substrate can be avoided by heat shields (11), e.g. Schott CERAN™ plates, providing only restricted access to the substrate surface (usually recommended is a second heat shield (11) on top of (1) avoiding heat caused deformations of (1)). If the flame outlet of the burner is metallic it can be directly connected to the feedback controlled high voltage DEB source (3). Otherwise the original electrode (2, lower electrode in FIG. 1A) must be placed in the flame or near the DEB location. Asymmetric heating of the substrate surface (i.e. one sided heating) leads to asymmetric holes (FIG. 3B). After CDEB voltage application, DEB is initiated by a short contact between flame and the substrate region to perforate. The voltage source (3) is controlled according to the description of FIG. 1A.

Figure 2A:
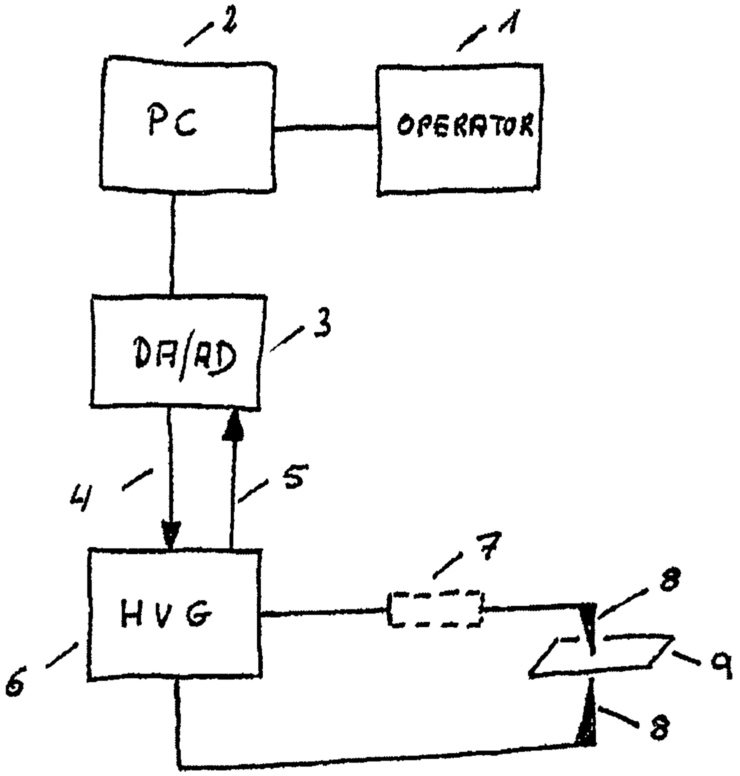
FIGS. 2A-B illustrates a typical embodiment of the current-voltage control of the device for CDEB perforation of this invention.

FIG. 2A is a schematic diagram illustrating a possible embodiment of a current-voltage source for formation of CDEB structures, such as holes for carriers of biological membranes. The operator (1) sets via a computer (2) with attached digital-analog/analog-digital converter (3) the voltage (4) and maximum current (4) of the controllable high voltage source (6) (e.g. EuroTest CPP300304245, Germany). Voltage is applied to the carrier (9) via electrodes (8) and an optional current limiting resistor (7). The resistor may be necessary when the internal current limitation of the voltage source is not precise or does not respond quickly enough for some substrates or large capacitances in parallel to the electrodes render the current limitation circuits of the voltage source inefficient for quick response. The current through the substrate (9) is monitored by the computer via a current monitoring signal (5) coming from a current monitor, which may be part of the voltage source. Upon beginning of the dielectric breakdown a timer is triggered that sets the duration of the controlled current flow. This consequently sets the electric energy at a given voltage, which is partially transformed into heat energy, driving the actual hole forming process. For many substrate materials, e.g. glass, the current flow interval after DEB detection can be set to zero.

Figure 2B:
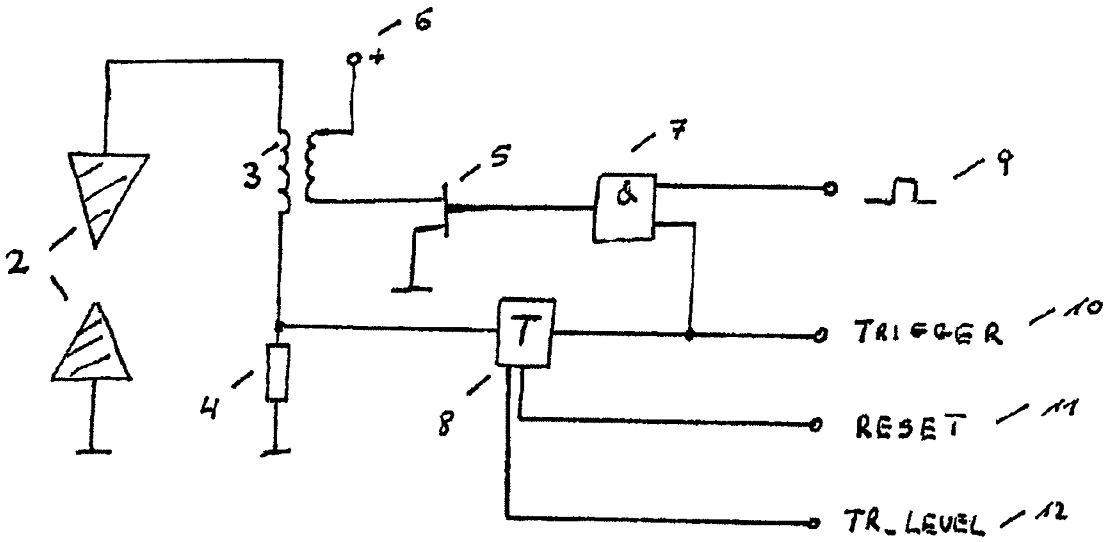

FIG. 2B is a schematic diagram illustrating a possible embodiment of a current-voltage source for intrinsically heat supported CDEB based on AC voltages only. The DEB voltage electrodes (2) are connected to ground and the output of a high voltage transformer (3, e.g. flyback transformer without rectifier from CRT type monitor), respectively. The transformer output is also grounded via a resistor (4), serving as trans-substrate current monitor. The transformer is driven via a transistor (5, e.g. IGBT or power npn). The transistor is driven by pulse trains usually received from a computer controlled AD/DA converter. Upon DEB onset, the increased trans-substrate current leads to an increased voltage drop across (4) which is sensed by the trigger (8). The trigger signal (activ=Low!) disables via an AND gate (7) the transistor (5) and consequently further high voltage generation, even if the computer did not yet process the trigger signal (10). The voltage drop across (4) and consequently trans-substrate current at which high voltage generation is stopped is set by the trigger level line (12). The trigger compares the voltages across (4) and (12) (e.g. using the LM393 comparator) and consequently sets an internal RS flip-flop which disables (5) via (7) until reset (i.e. trigger output=High) by the operator/computer via (11).

FIG. 3A shows a microscopic image (upper picture) of a hole produced with CDEB in a 20 um thick polypropylene (PP) sheet. The hole diameter is ca. 5 um (aspect ratio ca. 4). The lower part shows the current-voltage curve (uA-kV) recorded while the trans-substrate voltage was increased until DEB occurred. The parameters were: R=10 GOhm, V_DEB=6.4 kV, I_trigger=1.8 uA and the voltage was raised with dV/dt=60V/80 ms. Voltage was lowered to 0 kV immediately upon detection of DEB at ca. 6.4 kV. Electrode distances to the PP sheet were ca. 10-200 um.

FIG. 3B shows microscopic images of holes produced with thermally supported CDEB (according to FIG. 1D) in a ca. 170 um thick glass cover slide. The hole diameter is ca. 3 um. The parameters were: V=20 kV, I_trigger=40 uA, flame source butane micro torch with flame touching substrate until DEB. Voltage and flame were turned off immediately after DEB onset. Electrode distance to the glass substrate surface was 300 um. The micro torch metallic flame outlet was connected to the voltage source. Upper picture: torch side of the substrate/hole; lower picture: opposite side of the substrate/hole.

FIG. 3C shows electron microscopic images of the heating filament side of holes produced with thermally supported CDEB (according to FIG. 1B) in a ca. 170 um thick glass cover slide (Menzel S1) at different magnifications (upper panel 1500×/lower panel 5000×, scale bar see figure). At 1500×, glass filaments ejected during CDEB and now covering the substrate surface are visible.

Figure 3D:
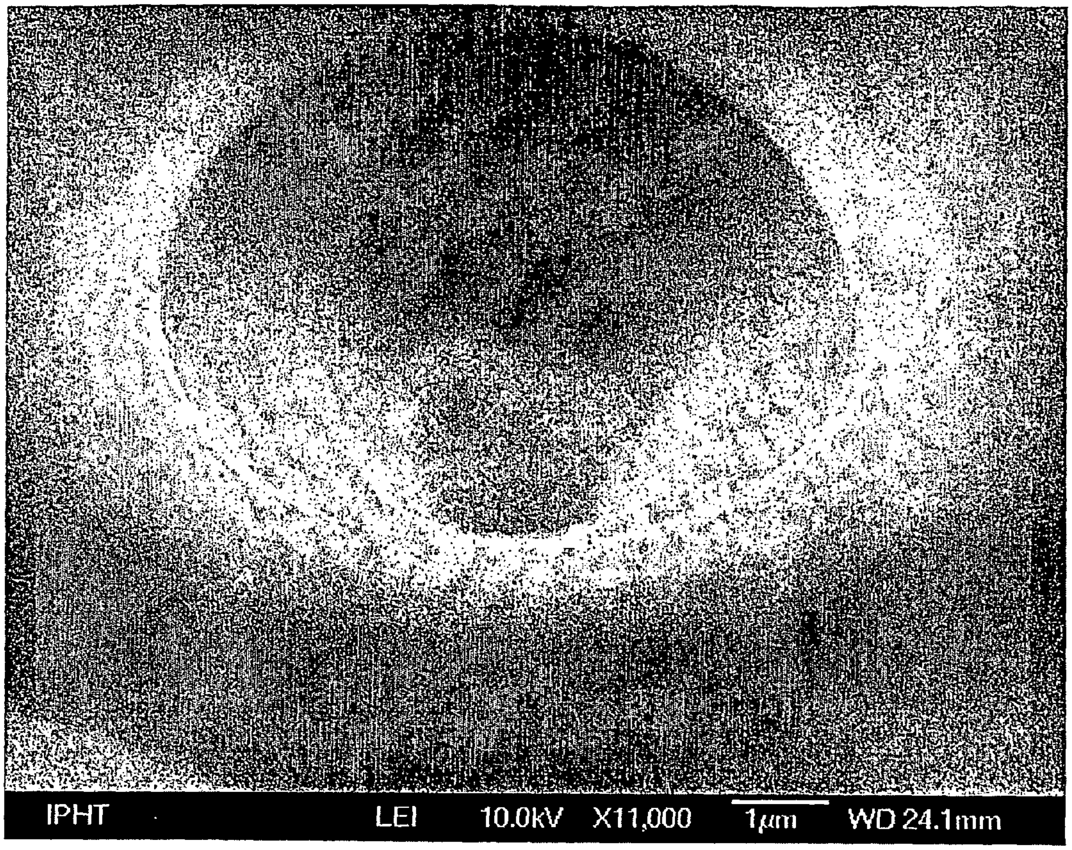
Figure 3E:
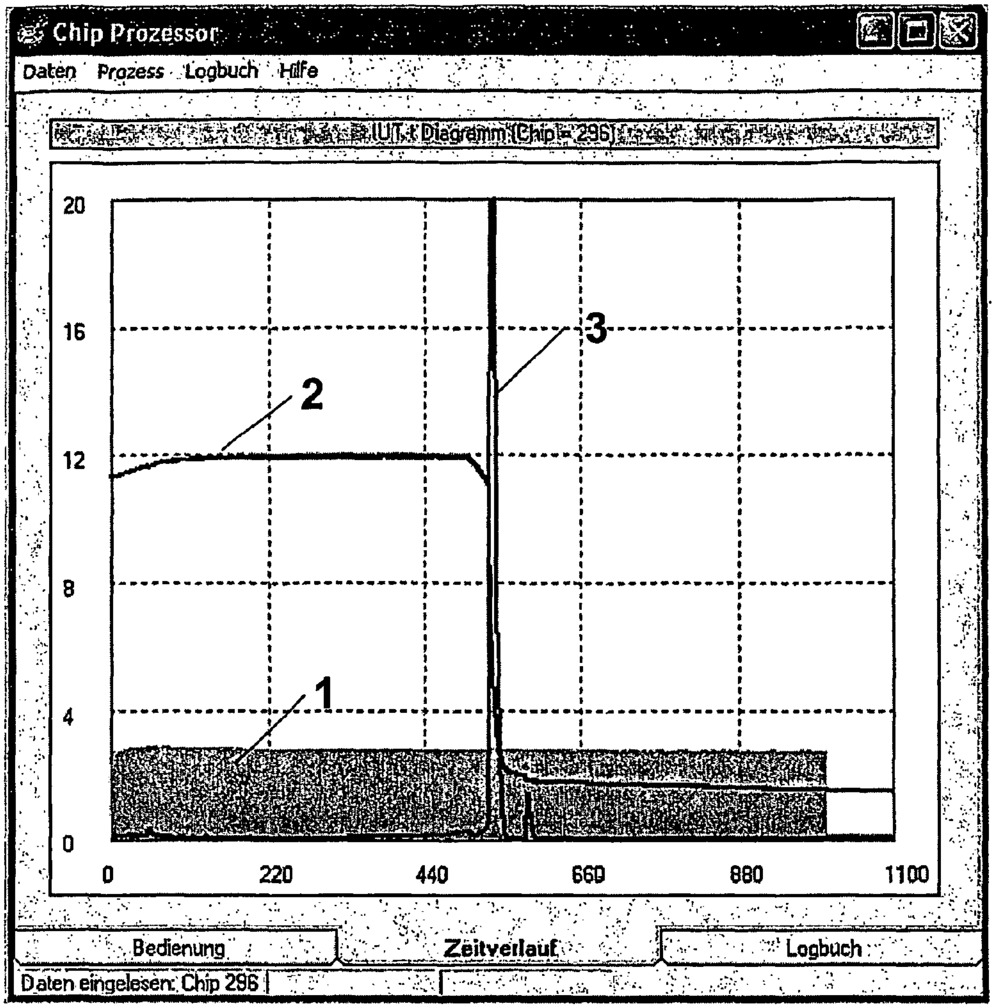

FIG. 3D shows an electron microscopic image of the voltage electrode side of holes produced with thermally supported DEB (according to FIG. 1B) in a ca. 170 um thick glass cover slide (Menzel S1, scale bar see figure).

FIG. 3E shows the time course of the current (3)-voltage (2) relationship during the thermally supported perforation of a standard microscopic cover slide (Menzel S1 20×20) with a pure DC voltage (vertical axis indicating kV and 30*uA, i.e. maximum substrate current shown is 600 uA, horizontal axis in milliseconds). After voltage application, the DEB process is initiated by a short heating pulse using a Pt filament (ca. 1×1 mm2 active area parallel to the slide surface) mounted c lose (ca. 0.3 mm) to the slide surface. The heating filament serves also as ground electrode. The voltage electrode was mounted ca 0.5 mm from the cover slide opposite the ground electrode. The current heating the filament is indicated (1). The filament heating current interval was preset; the DC voltage of ca. 12 kV was shut-down immediately after dielectric breakdown detection. The trigger signal used for this shut-down was a sudden raise of several orders of magnitude of the substrate current (3) accompanying the hole formation (see figure at ca. 530 ms). The hole was ca. 3 um in diameter (aspect ratio ca. 50). This cover slide was used in a patch clamp setup and produced a giga seal with Jurkat-cells in Ringer solution within less than 5 sec after moving of a cell over the hole by suction. The optimal heating current was determined experimentally and is shown in arbitrary units; heat produced by the Pt-filament was controlled by the duty cycle of the 5V/10 kHz heating power supply.

Figure 3F:
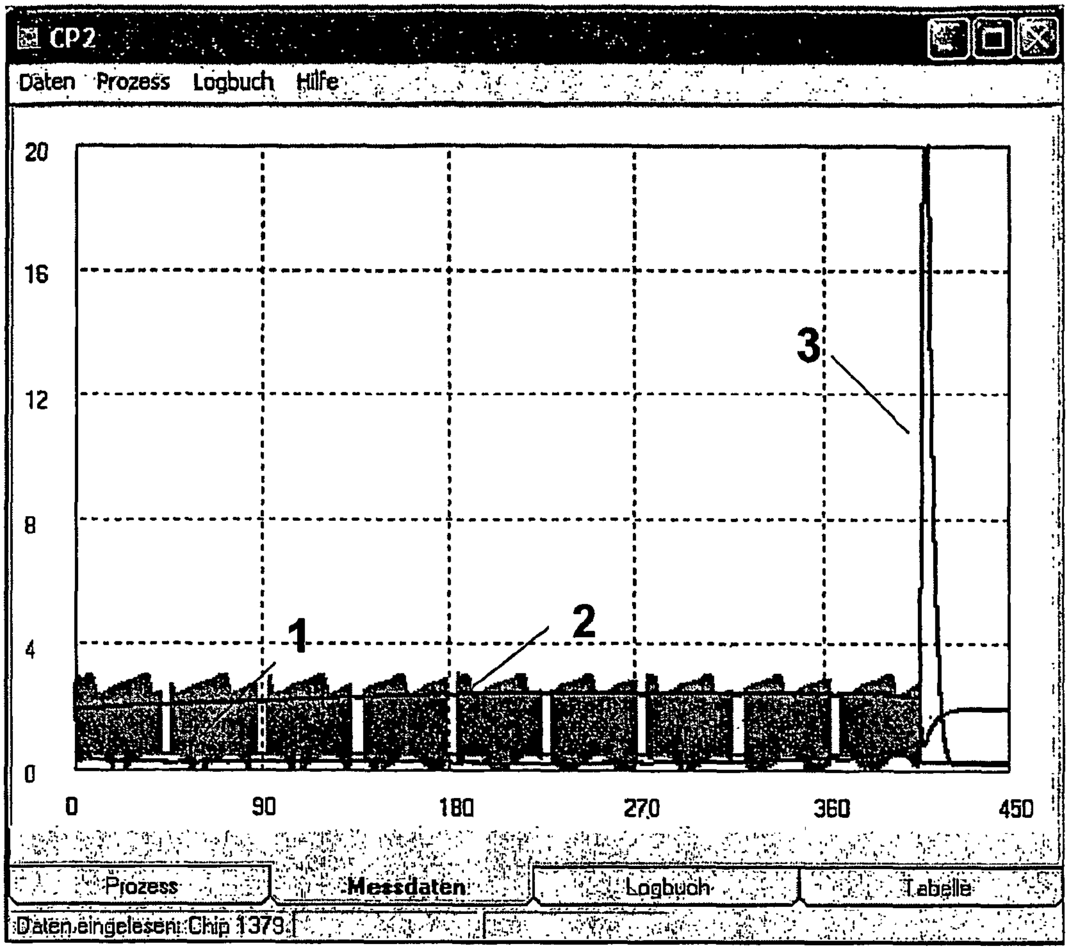

FIG. 3F depicts the conditions during a combined AC-DC voltage produced CDEB. After application of the DC voltage (2), an additional AC voltage source in series with the DC supply is activated, providing an AC voltage of ca 10,000-30,000 V, f=15 kHz, duty cycle=0.4 (the current in Ampere supplied to the primary coil of the AC supply high voltage transformer is shown (1)). The AC voltage was supplied intermittently (two series of 10 pulses of 60 and 40 ms ($2^{nd}$ series shown), respectively, with 5 ms between AC pulses; pulse 10 not applied because of trigger signal induced AC and DC shut down) to better control the substrate heating process, thus avoiding micro cracks in the substrate caused by mechanical tensions. The AC current induced heating of the substrate leads to a dielectric breakdown during which substrate material is ejected leading to a ca. 3 um hole (aspect ratio ca. 50) and usually the deposition of thin filaments ejected from the hole on the substrate surface. A strong increase in AC current during DEB was used as trigger signal for immediate AC and DC voltage shut down to avoid closing the hole by excess molten glass. DEB also leads to a typical increase in DC current (3). Substrate: Cover slide (Menzel S1 18×18). The horizontal axis is in milliseconds, the vertical axis shows V in kV units and current in uA*30, the maximum substrate current (DC component) shown is 600 uA.

Figure 3G:
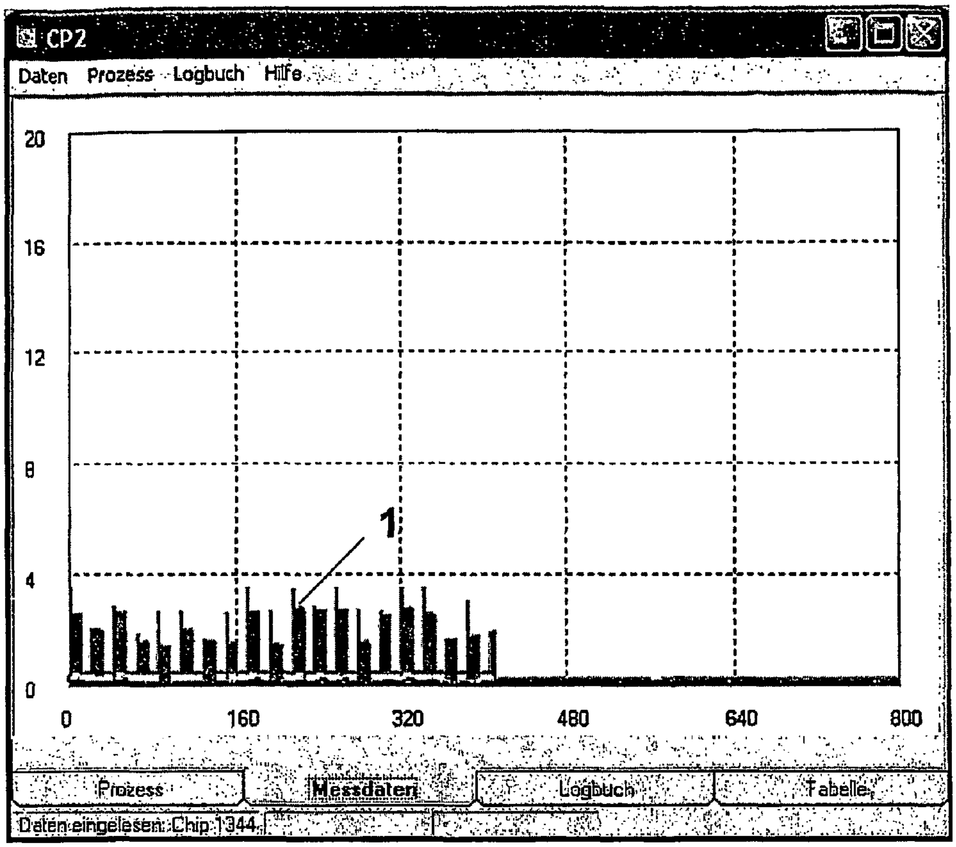

FIG. 3G depicts the time course of a hole formation by intrinsically heat supported CDEB (AC only) in a standard microscopic cover slide (Menzel S1). The AC current flowing through the primary coil of a high voltage transformer during substrate structuring is shown (1). The current flow as well as electric arcs between the electrodes and the substrate as well as dielectric losses inside the substrate lead to a fast (nearly approaching exponential growth) temperature increase causing melting, evaporation and ejection of substrate material out of the forming hole. This material can be found as thin filaments at the substrate surface. To avoid closing the hole again with excessively molten glass, the AC voltage is immediately turned off after hole formation. Parameter: f=20 kHz, duty cycle 0.65, AC voltage amplitude ca. 10,000-30,000 V, 40 AC voltage pulses a 10 ms with 10 ms off-time in between preset; pulse application was stopped immediately upon hole formation, which was indicated by a strong increase in trans-substrate current as well as increase of the current through the primary transformer coil; pointed Pd-electrodes were used with a distance of ca. 0.5 to 1 mm to substrate surface. Hole sizes under these conditions ranged between 1-5 um (aspect ratio between 120-30). The horizontal axis is in milliseconds, the vertical axis in Ampere.

FIG. 4 shows a possible realisation of a device using CDEB micro structured carriers for electrical membrane measurements. The carrier (1) separates two fluid compartments having any shape and boundaries (8, 9) which are only connected through the carrier channel (2) formed by CDEB. One side of the channel is covered by a biological membrane (3). Upon tight binding of the biological membrane such as an artificial unilamellar lipid bilayer to the carrier surface, voltages applied through the fluid immersed (redox) electrodes (4) lead to a current that is only dependent on the properties of the biological membrane itself. Current voltage measurements may be performed with a suitable device (5) allowing to set the voltage (6) and measure the current (7). For some electrophysiological measurements the device (5) may be substituted with a voltage measuring device.

FIG. 5 shows a possible realisation of a device using CDEB micro structured carriers for electrical membrane measurements on biological cells such as patch clamp measurements. The carrier (1) separates two fluid compartments (6, 7) which are only connected through the CDEB produced channel (2). One side of the channel is covered by a biological cell (3). Upon tight binding of the biological cell to the carrier surface, voltages applied through the fluid immersed (redox) electrodes (4) lead to a current that is only dependent on the properties of the cell membrane. Upon removal of the membrane patch covering the hole, the almost entire remaining cell membrane contributes to the trans-carrier current (whole cell mode). Current voltage measurements may be performed with a suitable device (5), such as a patch clamp amplifier (e.g. Axon Instruments).

Figure 6:
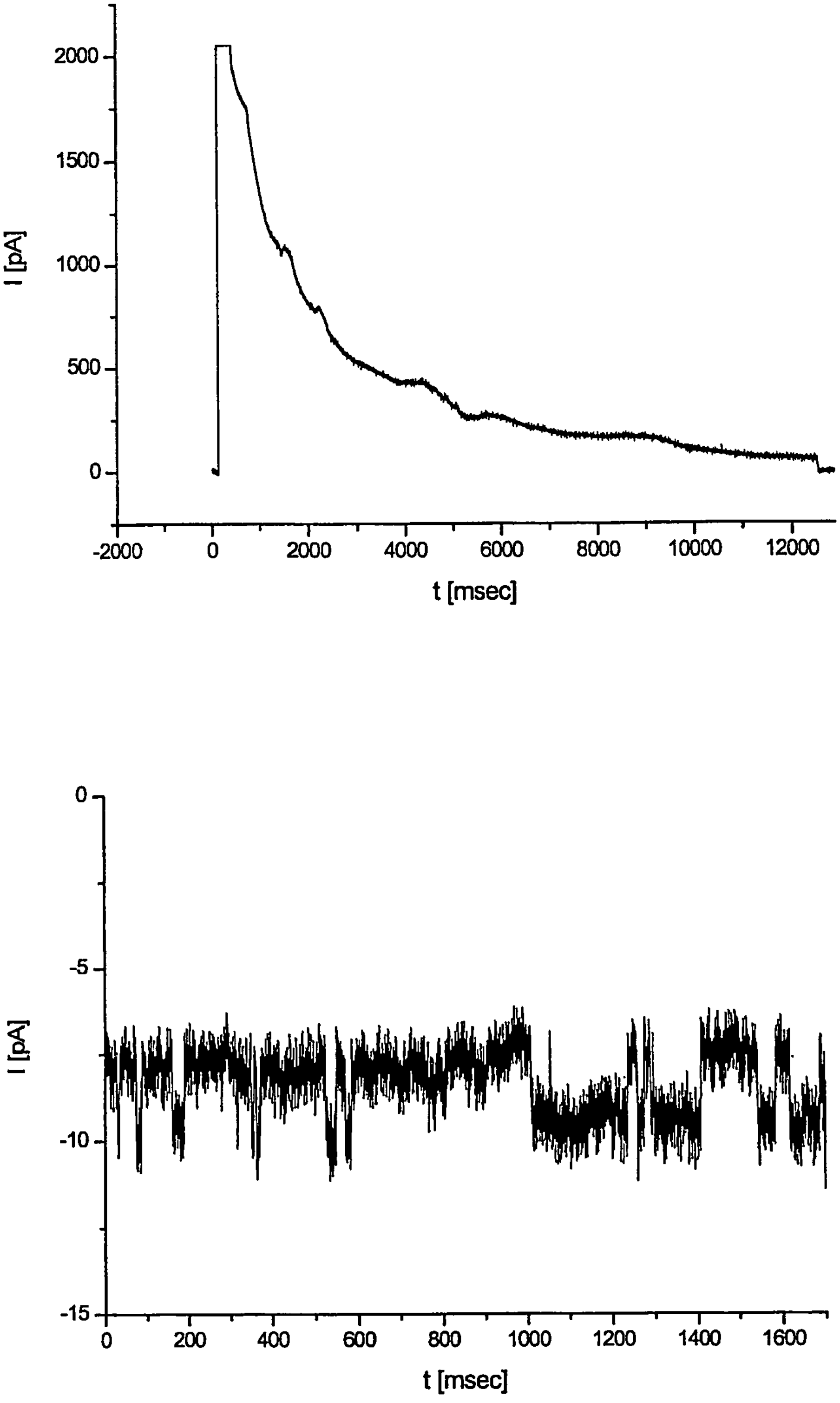
FIG. 6 shows a time course of the trans-carrier current during seal formation of a biological cell and recorded single ion channel currents after seal formation.

FIG. 6 illustrates the sealing process of a K562 cell to a CDEB produced carrier used in a patch clamp configuration (upper panel) and subsequent single channel recordings in cell attached mode (lower panel). Menzel S1 cover slides were perforated using an intrinsically heat supported CDEB process (AC only, train of 4 pulses with 200 ms duration separated by 100 ms off-time, V ca. 20,000 V at 40 kHz, trigger current (here, the current through the primary coil of the high voltage transformer was monitored) was linearly raised form 2000 mA (first pulse) to 2400 mA (last pulse), pointed palladium electrodes with 2.5 mm electrode distance; the slide was tempered after hole formation by short (ca. 0.5-3 sec) heating with a micro torch flame) and inserted into a set up similar to FIG. 5 (electrodes Ag/AgCl) but allowing for an air pressure reduction at the lower compartment. Buffer volumes were ca. 10^−5 L, buffer used was Krebs. Carrier access resistances ranged from 6 to 12 MOhm. For cell measurements, ca. 3*10−6 L of a cell suspension (10^7/ml cell density) were added to the upper compartment; cells were positioned by reduction of the ambient air pressure at the lower compartment by ca. 1-50 mbar. Cell positioning usually occurred within 0-20 sec after cell addition; in the upper panel, the sealing process is monitored by application of a voltage V=+60 mV using the Ag/AgCl electrodes. The decrease in leakage current indicates the progressing sealing process. Final seal resistance was ca. 4 Gigaohm. Subsequent application of a voltage of V=−30 mV revealed the activity of membrane channels in cell attached mode (lower panel). All voltage clamp and current recordings were performed using an amplifier Axopatch 1D (Axon Instruments) with a filter frequency of 5 kHz using the build in filter and the Fetchex (Axon Instruments) software.

The invention claimed is:

1. A method of forming a hole or cavity or channel in a region of an electrically insulating substrate, comprising the steps:

a) providing an electrically insulating substrate, b) applying, by means of a voltage supply, a voltage across a region of said electrically insulating substrate, said region having a size less than that of the entire substrate, said voltage being sufficient to give rise to a significant increase in electrical current through said region and to a dielectric breakdown (DEB) through said region, c) applying heat in a directed and locally restricted manner to said region only by using a laser or other focused light source or a gas flame, or by applying an AC voltage to said region so as to increase the temperature of said region to define the location where dielectric breakdown is to occur, said heat originating either from said laser or other focussed light source or said gas flame or from components of said voltage applied in step b), said heat being applied so as to reduce the amplitude of voltage required in step b) to give rise to said current increase through said region, wherein step b) is performed and ended using an electronic feedback mechanism operating according to user-predefined parameters, said electronic feedback mechanism controlling the properties of said applied voltage and/or of said electrical current, wherein said electronic feedback mechanism comprises an analysis circuit which is a current analysis circuit or a voltage and current analysis circuit, alone or as part of a user-programmed device, said analysis circuit controlling voltage supply output parameters in relation to a trans-substrate voltage and current flow according to user-predefined procedures, wherein step b) occurs by the placement of electrodes at or near said region by placing one electrode on one side of that substrate and by placing another electrode on another side of said substrate, and by application of said voltage across said electrodes.

2. The method according to claim 1, wherein said electronic feedback mechanism causes an end of step b) within a user-predefined period after onset of said dielectric breakdown.

3. The method according to claim 1, wherein said significant increase in electrical current is an increase in the number of charge carriers per unit time by a factor of 2.

4. The method according to claim 2, wherein said electronic feedback mechanism causes said end of step b) to occur—with or without a preset delay—at the time when said electrical current has reached a threshold value in the range of 0.01 to 10 mA, or at the time, when an increase in electrical current, (dI/dt), has reached a threshold value equal or larger than 0.01 A/s.

5. The method according to claim 1, wherein said electronic feedback mechanism is fast enough to be able to cause an end of step b) within a period in the range of from 1 ns to 100 ms after onset of said dielectric breakdown, or within the aforementioned period after said increase in electrical current has reached said threshold value.

6. The method according to claim 5, wherein said electronic feedback mechanism causes an end of step b) within a period in the range of from 100 ns to 10 s after onset of said dielectric breakdown or after said increase in electrical current has reached said threshold value.

7. The method according to claim 2, wherein said end of step b) occurs without any intervention by a user once step b) has been initiated.

8. The method according to claim 1, wherein said analysis circuit controls said laser or other focussed light source or said gas flame, if present.

9. The method according to claim 1, wherein steps b) and c) occur concomitantly.

10. The method according to claim 1, wherein step c) is performed under control of a user, by use of said electronic feedback mechanism.

11. The method according to claim 10, wherein said control of a user involves definition or regulation of the amount and/or the duration of said heat applied to said region in step c).

12. The method according to claim 1, wherein said electronic feedback mechanism provides for a regulation of amplitude and/or duration of said voltage and/or said current.

13. The method according to claim 1, wherein said voltage is in the range of 102 V to 106 V.

14. The method according to claim 1, wherein step c) is initiated before step b).

15. The method according to claim 1, wherein step c) is continued after step b) has been ended.

16. The method according to claim 1, wherein, at the beginning of step b), said voltage is increased in amplitude up to a value, at which an increase in electrical current through said region occurs and/or where a dielectric breakdown (DEB) through said substrate occurs and/or where an electric arc occurs.

17. The method according to claim 1, wherein said current flows along a current path through said substrate region and changes viscosity and/or stiffness and/or brittleness of said substrate along and near said current path.

18. The method according to claim 17, wherein said current softens and/or melts and/or evaporates said substrate along and near said current path, and/or wherein said current and/or said applied voltage cause the removal of substrate material along and near said current path by evaporation, ejection, electrostatic attraction or a combination thereof.

19. The method according to claim 1, wherein said applied voltage is purely DC.

20. The method according to claim 1, wherein said applied voltage is purely AC.

21. The method according to claim 1, wherein said applied voltage is a superposition of AC and DC voltages.

22. The method according to claim 20, wherein the frequency of said applied AC voltage is in the range of from 102 to 1012 Hz.

23. The method according to claim 20, wherein said AC voltage is applied intermittently in pulse trains of a duration in the range of from 1 ms to 1000 ms, with a pause in between of a duration of at least 1 ms.

24. The method according to claim 20, wherein said applied AC voltage has parameters (e.g. amplitude, frequency, duty cycle) which are sufficient to establish an electric arc between a surface of said substrate and said electrodes.

25. The method according to claim 24, wherein said electric arc is used for performing step c).

26. The method according to claim 20, wherein said applied AC voltage leads to dielectric losses in said region of said substrate, said dielectric losses being sufficient to increase the temperature of said region.

27. The method according to claim 20, wherein the frequency of said applied AC voltage is increased to reduce deviations of the current path from a direct straight line between the electrodes.

28. The method according to claim 20, wherein the frequency of said applied AC voltage is increased to minimize the possible distance between neighboring structures.

29. The method according to claim 1, wherein, in step c), heat is applied to said region so as to decrease the voltage amplitude required to initiate dielectric breakdown across this region.

30. The method according to claim 1, wherein said AC voltage is applied to said region by electrodes placed on opposite sides of said substrate.

31. The method according to claim 30, wherein said electrodes placed on opposite sides of said substrate are also used for performing step b).

32. The method according to claim 1, wherein said AC voltage is sufficient to cause dielectric losses in said region of said substrate leading to an increase in temperature in said region.

33. The method according to claim 32, wherein said AC voltage is in the range of 103 V-106 V and has a frequency in the range of from 102 Hz to 1012 Hz.

34. The method according to claim 1, wherein said structure being formed is a hole having a diameter in the range of from 0.01 μm to 50 μm.

35. The method according to claim 1, wherein said structure being formed is a cavity having a diameter in the range of from 0.1 μm to 100 μm.

36. The method according to claim 1, wherein said voltage is applied by electrodes placed on opposite sides of said substrate, and said structure being formed is a channel-like structure obtained by a relative movement of said electrodes in relation to said substrate.

37. The method according to claim 1, wherein said structure has an aspect ratio greater than 1.

38. The method according to claim 1, wherein said region where a structure is to be formed, has a thickness in the range of from 10-9 m to 10-2 m.

39. The method according to claim 1, wherein said substrate is provided in step a) within a material (solid, liquid or gas) that reacts with a surface of said substrate during steps b) and/or c).

40. The method according to claim 1, wherein, after formation of said structure, a surface of said structure is smoothed by further application of heat through step c).

41. The method according to claim 1, wherein, after formation of said structure, its shape is subsequently altered by further application of heat through step c).

42. The method according to claim 40 or 41, wherein said further application of heat occurs by an electric arc formed between two electrodes.

43. The method according to claim 1, wherein said electrically insulating substrate is a substrate, wherein dielectric breakdown occurs using a small voltage, in the absence of additional heat or energy, and wherein step c) is omitted altogether.

44. The method according to claim 41, wherein said further application of heat occurs by an electric are formed between two electrodes.

45. The method according to claim 17, wherein step b) does not lead to a breakage of said substrate, and wherein said current, current increase and voltage parameters are limited by a user to values, said values being determined experimentally for each substrate material and/or substrate material class, at which values no breakage of said substrate is caused.

46. The method according to claim 20, wherein said applied AC voltage is used for performing step c).

* * * * *